United States Patent [19]

Kawabata et al.

[11] Patent Number: 4,960,841

[45] Date of Patent: Oct. 2, 1990

[54] POLYPHENYLENE SULFIDE/POLYPHENYLENE SULFIDE SULFONE BLOCK COPOLYMER

[75] Inventors: Juheiji Kawabata, Takaishi; Manabu Chiba, Izumi-ohtsu; Toshinori Sugie, Takaishi; Fumihiro Kobata, Izumi; Hitoshi Izutsu, Osaka; Toshio Inoue, Osaka; Takayuki Mine, Nara, all of Japan

[73] Assignee: Dainippon Ink and Chemicals, Inc., Tokyo, Japan

[21] Appl. No.: 292,633

[22] Filed: Dec. 30, 1988

Related U.S. Application Data

[63] Continuation of Ser. No. 93,204, Sep. 4, 1987, abandoned.

[30] Foreign Application Priority Data

Nov. 20, 1986 [JP] Japan ............................ 61-277599
May 7, 1987 [JP] Japan ............................ 62-109900
May 11, 1987 [JP] Japan ............................ 62-112427

[51] Int. Cl.$^5$ ............................................. C08G 75/14
[52] U.S. Cl. ..................................... 525/537; 528/388; 525/310; 525/420; 525/462; 525/437; 524/609
[58] Field of Search .......................... 525/537; 528/388

[56] References Cited

U.S. PATENT DOCUMENTS

| | | | |
|---|---|---|---|
| 4,654,410 | 3/1987 | Kashiwami et al. | 525/537 |
| 4,659,789 | 4/1987 | Katto et al. | 525/537 |
| 4,678,831 | 7/1987 | Kawabata et al. | 525/537 |
| 4,734,470 | 3/1988 | Kawabata et al. | 525/537 |
| 4,785,057 | 11/1988 | Shiiki et al. | 525/537 |

*Primary Examiner*—Melvyn I. Marquis
*Assistant Examiner*—David W. Woodward
*Attorney, Agent, or Firm*—Sherman and Shalloway

[57] ABSTRACT

A process for producing a block copolymer composed of polyphenylene sulfide segments and polyphenylene sulfide sulfone segments comprises reacting a polyphenylene sulfide prepolymer with a mixture of a dihalodiphenyl sulfone and a sulfidization agent, or a polyphenylene sulfide sulfone prepolymer with a mixture of a polyhalogenated aromatic compound and a sulfidization agent.

6 Claims, 1 Drawing Sheet

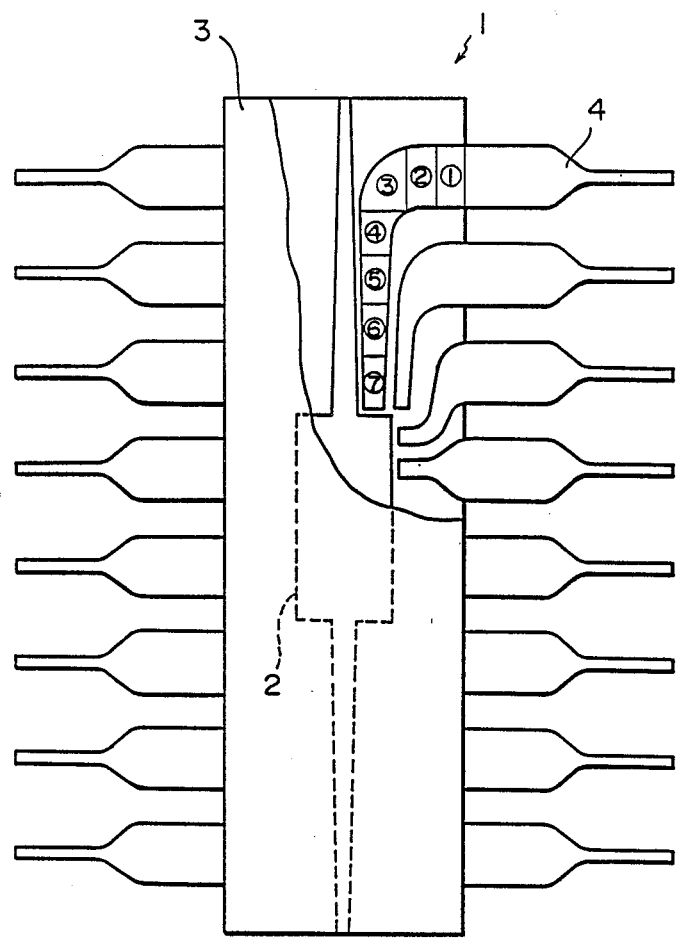

POLYPHENYLENE SULFIDE/POLYPHENYLENE SULFIDE SULFONE BLOCK COPOLYMER

This application is a continuation of application Ser. No. 093,204, filed Sept. 4, 1987, now abandoned.

BACKGROUND OF THE INVENTION

1. Field of the Invention:

This invention relates to a process for producing a block copolymer composed of polyphenylene sulfide (to be abbreviated as PPS hereinafter) segments and polyphenylene sulfide sulfone segments, and a composition comprising the block copolymer. More specifically, this invention relates to process for producing a block copolymer by chemically bonding an aromatic sulfide sulfone polymer as soft segments to PPS. The block copolymer is improved in mechanical properties having to do with toughness, such as impact strength and pliability, and can be used as various molding materials. The invention also pertains to a composition comprising the block copolymer.

2. Description of the Related Art:

PPS has attracted attention as high performance engineering plastics having outstanding heat resistance, chemical resistance and rigidity over ordinary engineering plastics such as nylon, polycarbonate, polybutylene terephthalate and polyacetal. The PPS resin, however, has the serious defect that it has low toughness and is fragile as compared with the ordinary engineering plastics. In recent years, linear PPS different from the conventional heat-crosslinked PPS has been developed, but in the crystallized state, it has poor toughness characteristics such as low impact strength and elongation.

In order to improve the impact strength of PPS, it has been the previous practice to incorporate a filler such as glass fibers. But since this method does not bring about a sufficient result, it is not effective for the prevention of cracking owing to molding shrinkage strains.

On the other hand, preparation of a polymer blend of PPS with a flexible polymer is an effective method. But since there are few polymers which are flexible and have excellent heat resistance and chemical resistance or the compatibility of the flexible polymer with PPS is insufficient, problems arise such as the reduction of mechanical strength (flexural strength, etc.) and the deterioration of the surface condition of the molded articles. No PPS has yet been obtained which has improved impact strength and flexibility without impairing the inherent characteristics of the PPS resin.

In view of the foregoing state of art, the present inventors have made extensive investigations in order to obtain a PPS resin having improved mechanical properties such as improved impact strength and excellent blending compatibility, and have consequently found that a block copolymer resin obtained by copolymerizing PPS and PPSS to bond them chemically is an effective resin having these desirable properties.

SUMMARY OF THE INVENTION

According to this invention, there is provided a resin composition comprising a block copolymer composed of PPS segments and PPSS segments and at least one polymer selected from the group consisting of PPS, PPSS, polysulfones, polyphenylene oxides, polyarylates, polycarbonates and polyetherimides, and optionally a filler.

The present invention also provides a composition for molding or for encapsulation of electronic component parts, comprising the above copolymer and PPS and/or PPSS, and optionally a filler.

The present invention also provides a process for producing a block copolymer composed of PPS segments and PPSS segments and having a logarithmic viscosity $[\eta]$ of 0.03 to 1.0, said logarithmic viscosity $[\eta]$ being determined at 206° C. for its solution in alpha-chloronaphthalene in a polymer concentration of 0.4 g/100 ml of solution and calculated in accordance with the equation $[\eta] = \ln$ (relative viscosity)/polymer concentration, which comprises reacting a PPS prepolymer in an amide-type polar solvent with a PPSS prepolymer having a logarithmic viscosity $\eta_{inh}$ of 0.05 to 1.0, said logarithmic viscosity $\eta_{inh}$ being determined at 30° C. for its solution in a phenol/1,1,2,2-tetrachloroethane (3:2 by weight) mixed solvent in a polymer concentration of 0.5/100 ml of solution and calculated in accordance with the equation $\eta_{inh} = \ln$ (relative viscosity)/polymer concentration.

The present invention further provides a process for producing a block copolymer composed of PPS segments and PPSS segments and having a logarithmic viscosity $[\eta]$ of 0.03 to 1.0, said logarithmic viscosity $[\eta]$ being determined at 206° C. for its solution in alpha-chloronaphthalene in a polymer concentration of 0.4 g/100 ml of solution and calculated in accordance with the equation $[\eta] = \ln$ (relative viscosity)/polymer concentration, which comprises reacting in an amide-type polar solvent a PPS prepolymer with a mixture of a dihalodiphenylsulfone and a sulfidization agent, or reacting a PPSS prepolymer with a mixture of a polyhalogenated aromatic compound and a sulfidization agent.

BRIEF DESCRIPTION OF THE DRAWING

The drawing figure illustrates the test areas ① to ⑦ of a 16 pin IC lead frame utilized in evaluating resin quality for encapsulation of electronic components.

DETAILED DESCRIPTION OF THE INVENTION

The logarithmic viscosity a), used in this invention, is synonymous with the inherent viscosity generally used in this field and particularly in fields related to PPS.

The PPS segments constituting the block copolymer of this invention preferably contain at least 30 mole %, especially at least 70 mole %, of structural units represented by the general

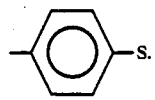

If the amount of the structural units is less than 30 mole %, it is difficult to obtain a block copolymer having excellent properties. Preferably, PPS has a logarithmic viscosity $[\eta]$, as defined hereinabove, of 0.03 to 0.80.

This polymer can be produced, for example, by polymerizing a halogen-substituted aromatic compound such as p-dichlorobenzene in the presence of a sulfur source and sodium carbonate; polymerizing a halogen-substituted aromatic compound in an organic amide-type polar solvent in the presence of a combination of sodium sulfide or sodium hydrosulfide and sodium hydroxide, a combination of a sulfur source such as hydrogen sulfide and an alkali metal hydroxide such as sodium hydroxide, or a sodium aluminoalkanoate; or by self-condensing p-chlorothiophenol. One suitable method is to react p-dichlorobenzene with sodium sulfide in an amide solvent such as N-methylpyrrolidone or dimethylacetamide or a sulfone-type solvent such as sulfolane. Preferably, a carboxylic acid, a sulfonic acid, an alkali metal phosphate, or an alkali hydroxide may be added to regulate the degree of polymerization of the polymer. Copolymer components which will give a meta-linkage

an ortho-linkage

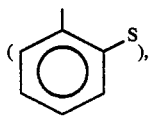

an ether linkage

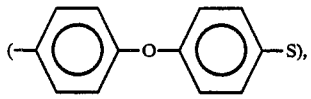

a sulfone linkage

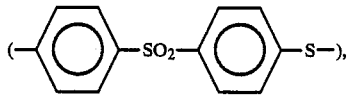

a biphenyl linkage

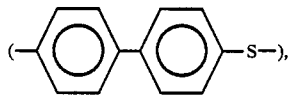

a substituted phenyl sulfide linkage

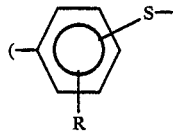

where R represents an alkyl group, a nitro group, a phenyl group, an alkoxy group, a carboxylic acid group or a metal carboxylate group), and a trifunctional linkage

may be used in an amount of not more than 30 mole % because in such amounts they do not greatly affect the crystallinity of the polymer. Preferably, the amount of the copolymer components is not more than 10 mole %. The amount of a copolymer component which gives a trifunctional or higher component such as a phenyl, biphenyl or naphthyl sulfide linkage is preferably not more than 3 mole %.

The polyhalogenated aromatic compound is a halogenated aromatic compound having at least two halogen atoms directly bonded to the aromatic ring. Specific examples include p-dichlorobenzene, m-dichlorobenzene, o-dichlorobenzene, trichlorobenzene, tetrachlorobenzene, dichloronaphthalene, trichloronaphthalene, dibromobenzene, tribromobenzene, dibromonaphthalene, diiodobenzene, triiodobenzene, sulfone, dichlorobenzophenone, dibromobenzophenone, dichlorodiphenyl ether, dibromodiphenyl ether, dichlorodiphenyl sulfide, dibromodiphenyl sulfide, dichlorobiphenyl, dibromobiphenyl and mixtures of these. Usually dihalogenated aromatic compounds are used, and p-dichlorobenzene is preferred. In order to increase the viscosity of the polymer by providing a branched structure, it is possible to use a small amount of a polyhalogenated aromatic compound having at least three halogen substituents per molecule in combination with the dihalogenated aromatic compound.

Examples of the sulfidization agent are alkali metal sulfide compounds, and combinations of a sulfur source and alkali metal hydroxide compounds.

The alkali metal sulfide compounds include, for example, lithium sulfide, sodium sulfide, potassium sulfide, rubidium sulfide, cesium sulfide, and mixtures of these. These alkali metal sulfides may be used as hydrates and/or aqueous mixtures, or in an anhydrous form. A small amount of an alkali metal hydroxide may be added in order to react it with an alkali metal bisulfide and an alkali metal thiosulfate present in trace amounts in the alkali metal sulfide. Sodium sulfide mono- to trihydrates are preferred as the alkali metal sulfide compound. Examples of the sulfur source are alkali metal hydrosulfide compounds, hydrogen sulfide, thioamide, thiourea, thiocarbanate, carbon disulfide, thiocarboxylate, sulfur and phosphorus pentasulfide. The alkali metal hydrosulfide compounds are preferred as the sulfur source. The alkali metal hydrosulfides include, for example, lithium hydrosulfide, sodium hydrosulfide, potassium hydrosulfide, rubidium hydrosulfide, cesium hydrosulfide and mixtures of these. These alkali metal hydrosulfide compounds may be used in the form of hydrates and/or aqueous mixtures or in an anhydrous form. Sodium hydrosulfide is preferred as the alkali metal hydrosulfide. It may be used in combination with an alkali metal hydroxide compound or instead, wit sodium N-methyl-4-aminobutyrate or an alkali metal carbonate compound.

Examples of the alkali metal hydroxide compound are potassium hydroxide, sodium hydroxide, lithium hydroxide, rubidium hydroxide, cesium hydroxide, and mixtures of these. Sodium hydroxide is preferred.

The organic amide-type polar solvent may, for example, be selected from N,N-dimethylformamide, N,N-dimethylactamide, N-methyl-2-pyrrolidone, N-ethyl-2-pyrrolidone, N-methyl-epsilon-caprolactam, hexamethylphosphoramide, and mixtures of these. N-methyl-2-pyrrolidone (SNMP) is especially preferred among these solvents.

The suitable proportion of the alkali metal hydroxide compound is 0.8 to 3.0 moles per mole of sulfur element in the sulfur source. When the alkali metal hydroxide compound is used in combination, its amount is suitably 0.9 to 1.2 moles for each 1.00 mole of the alkali metal hydrosulfide compound. If sodium N-methyl-4-aminobutyrate is used in combination, its amount is suitably 0.9 to 1.2 moles for each 1.00 mole of the alkali metal hydrosulfide.

When the hydrate of the alkali metal sulfide compound or the alkali metal hydrosulfide compound is used, it must be used in the reaction after it is dehydrated in a solvent. Dehydration of the alkali metal hydrosulfide is desirably carried out in the presence of the alkali metal hydroxide compound or sodium N-methyl-4-aminobutyrate.

The amount of the sulfidization agent is selected such that the proportion of sulfur element becomes 0.8 to 1.2 moles, preferably 0.9 to 1.1 moles, per mole of the dihalogenated aromatic compound. The amount of the organic polar solvent is 2.5 to 20 moles, preferably 3 to 10 moles, per mole of the dihalogenated aromatic compound.

Preferably, polymerization aids are added at the time of producing polyphenylene sulfide. Examples of the polymerization halides, metal carboxylates, and alkali phosphates.

The organic sulfonic acid metal salts are selected from a group of compounds represented by general formulae I to IV below.

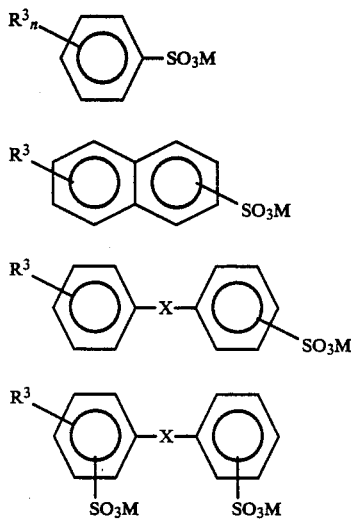

In the formula, $R^3$ represents hydrogen or an alkyl group having 1 to 30 carbon atoms, in represents 0, 1 to 2, M represents an alkali metal selected from sodium, potassium, rubidium and cesium, and X represents a direct bond, $-CH_2-$, $-C(CH_3)_2$, $-O-$, $-S-$, or

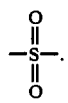

Specific examples of the acid group components constituting these metal sulfonates include benzenesulfonic acid, p-toluenesulfonic acid, 2,4-dimethylsulfonic acid, 2,5-dimethylbenzenesulfonic acid, p-ethylvenzenesulfonic acid, dodecylbenzenesulfonic acid, alphanaphthalenesulfonic acid, biphenylsulfonic acid, alkylnaphthalenesulfonic acids, laurylbenzenesulfonic acid and alkyldiphenyletherdisulfonic acids. Salts of these sulfonates may be in the form of anhydrous salts or hydrated salts, or in the form of an aqueous solution. Needless to say, the anhydrous salts are preferred in view of the purpose of this invention.

The lithium halides are selected from lithium chloride, lithium bromide, lithium iodide and mixtures thereof.

The organic groups of the organic carboxylic acid salts excluding the carboxyl group usually have 1 to 50 carbon atoms, and may contain nitrogen, oxygen, halogen, silicon or sulfur. Preferably, they are alkyl, cycloalkyl, aryl and alkylaryl groups. The metal atoms of the organic carboxylic acid metal salts are selected from lithium, sodium, potassium, rubidium, cesium, magnesium, calcium, zinc, strontium, cadmium and barium. The alkali metals are preferred.

Specific examples of the metal organic carboxylates include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, dilithium succinate, disodium succinate, dipotassium succinate, dilithium adipate, disodium adipate, dipotassium adipate, dilithium sebacate, disodium sebacate, dipotassium sebacate, dilithium decanedicarboxylate, disodium decanedicarboxylate, dipotassium decanedicarboxylate, dilithium phthalate, disodium phthalate, dipotassium phthalate, dilithium isophthalate, disodium isophthalate, potassium isophthalate, dilithium terephthalate, disodium terephthalate, dipotassium terephthalate, trilithium trimellitate, trisodium trimellitate, tripotassium trimellitate, tetralithium pyromellitate, tetrasodium pyromellitate, tetrapotassium pyromellitate, dilithium toluenedicarboxylate, disodium toluenedicarboxylate, dipotassium toluenedicarboxylate, dilithium naphthalenedicarboxylate, disodium naphthalenedicarboxylate, dipotassium naphthalenedicarboxylate, magnesium acetate, calcium acetate, calcium benzoate, the same kind of other salts, and mixtures thereof.

The alkali phosphate is selected from compounds of general formulae V and VI below.

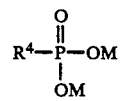

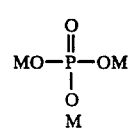

In the formulae, $R^4$ represents hydrogen, $C_1$-$C_{20}$ alkyl, $C_5$-$C_{20}$ cycloalkyl, $C_6$-$C_{24}$ aryl, $C_7$-$C_{24}$ alkaryl, $C_7$–$C_{24}$ aralkyl, $C_2$–$C_{24}$ alkenyl, $C_2$–$C_{20}$ alkynyl or $C_5$–$C_{20}$ cycloalkenyl, and M represents an alkali metal, preferably sodium. Trisodium phosphate and disodium salts of acids listed below are suitable for use in this invention. Methanephosphonic acid, ethane-1-phosphonic acid, propane-1-phosphonic acid, butane-1-phosphonic acid, butane-2-phosphonic acid, pentane-1-phosphonic acid, cyclohexane-1-phosphonic acid, vinyl-1-phosphonic acid, propene-2-phosphonic acid, butene-2-phosphonic acid, indene-2-phosphonic acid, phenylmethanephosphonic acid, (4-methyl-phenyl)-methane-phosphonic acid, beta-naphthyl-methane-phosphonic acid, 2-phenyl-ethane-1-phosphonic acid, 2,2-diphenyl-ethane-1-phosphonic acid, 4-phenyl-butane-1-phosphonic acid, 2-phenyl-ethylene-1-phosphonic acid, 2,2-diphenylethylene-phosphonic acid, phenyl-acetylenephosphonic acid, 4-phenyl-butadiene-phosphonic acid, benzene-phosphonic acid, 4-methyl-benzene-phosphonic acid, and 2-phenoxy-ethane-1-phosphonic acid.

At least one of these polymerization aids must be used. The alkali salts of organic sulfonic acids and metal salts of organic carboxylic acids are preferred, and a combination of an alkali salt of an organic sulfonic acid and a salt of an organic carboxylic acid is most preferred.

The amount of the polymerization aid may be selected from amounts sufficient to make it soluble in the amide-type polar solvent used in the polymerization. It is usually 0.01 to 300% by weight, preferably 0.5 to 200% by weight, based on the polyhalogenated aromatic compound.

The reaction temperature at which the polymerization is carried out in the process of this invention is generally 200° to 330° C., preferably 210° to 300° C. The pressure should be one which maintains the polymerization solvent and the halogenated aromatic compound as a monomer substantially in the liquid phase. Generally, it is 1.1 to 200 kg/cm², preferably 1.1 to 20 kg/cm².

The reaction time varies with temperature and pressure, but is generally 10 minutes to about 72 hours, preferably 1 to 48 hours.

PPSS constituting the block copolymer used in this invention is defined as a polymer having

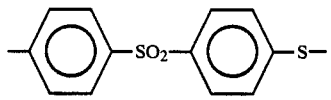

as recurring units. Preferably, it contains at least 70 mole % of recurring units represented by the general formula

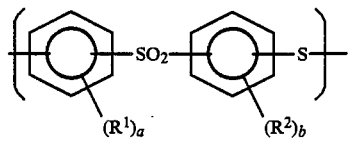

wherein groups bonded to both terminals of the polymer are ortho- or para- to the sulfone group, $R^1$ and $R^2$ represent hydrogen or a $C_1$–$C_8$ alkyl group and/or an aryl group, and a and b are integers of 0 to 4.

If the proportion of the recurring units is less than 70 mole %, it is difficult to obtain a block copolymer having excellent properties. This polymer preferably has a molecular weight corresponding to a logarithmic viscosity $\eta_{inh}$ of 0.05 to 1.0. The logarithmic viscosity $\eta_{inh}$ is determined at 30° C. for its solution in a phenol/1,1,2,2-tetrachloroethane (3:2 by weight) mixed solvent in a polymer concentration of 0.5 g/100 ml of solution and calculated in accordance with the equation $\eta_{inh} = \ln$ (relative viscosity)/polymer concentration. This polymer may be produced, for example, by reacting a dihalodiphenylsulfone with an alkali metal sulfide in an organic amide solvent (see U.S. Pat. No. 4,102,875. As a copolymer component, it may contain a sulfide linkage

an ether linkage

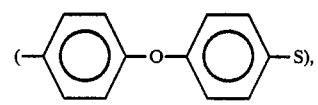

a carbonyl linkage

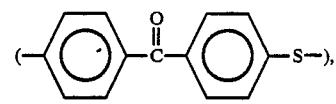

substituted phenyl sulfide linkage

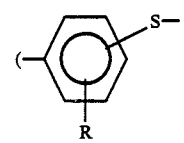

wherein R represents an alkyl group, a nitro group, a phenyl group, a carboxylic acid group, or a metal carboxylate group), a trifunctional linkage

etc. since such amounts do not greatly affect the properties of the polymer. Preferably, the proportion of the copolymer component is not more than 10 mole %. Preferably, the dihalodiphenylsulfone is represented by the following general formula

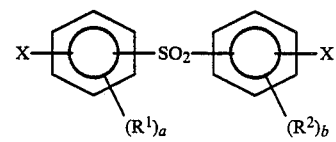

wherein X represents fluorine, chlorine, bromine or iodine ortho- or para- to the sulfone group, $R^1$ and $R^2$ represent hydrogen a $C_1$–$C_8$ alkyl group and/or an aryl group, and a and b are integers of 0 to 4.

Specific examples of the dihalodiphenylsulfone are bis(4-chlorophenyl)sulfone, bis(4-fluorophenyl)sulfone, bis(4-bromophenyl)sulfone, bis(4-iodophenyl)sulfone, bis(2-chlorophenyl)sulfone, bis(2-fluorophenyl)sulfone, bis(2-methyl-4-chlorophenyl)sulfone, bis(3,5-dimethyl-4-chlorophenyl)sulfone, and bis(2,3,5,6-tetramethyl-4-chlorophenyl)sulfone. These compounds are used either singly or in combination. Especially preferred is bis(4-chlorophenyl)sulfone. The halogenated aromatic compound, the sulfidization agent and the organic amide-type polar solvent used in the production of PPSS may be the same as those used to produce PPS.

The amount of the sulfidization agent used is 0.8 to 1.2 moles, preferably 0.9 to 1.1 moles, as sulfur element, per mole of the dihalodiphenylsulfone. The amount of the organic polar solvent used is 2.5 to 20 moles, preferably 3 to 10 moles, per mole of the dihalodiphenylsulfone. As required, polymerization aids may be used. The polymerization aids may be metal salts of organic sulfonic acids, lithium halides, metal salts of carboxylic acids and alkali phosphates which may be the same as described hereinabove. The amount of the polymerization aids is usually 0.01 to 300% by weight, preferably 0.5 to 200% by weight, based on the dihalodiphenylsulfone.

In the production of PPSS, the reaction temperature is generally 50° to 250° C., preferably 80° to 220° C. The pressure should be one which maintains the polymerization solvent and the halogenated aromatic compound as a monomer substantially liquid, and is generally not more than 200 kg/cm$^2$, preferably not more than 20 kg/cm$^2$. The reaction time differs depending upon temperature and pressure, but is generally 10 minutes to about 72 hours, preferably 1 to 48 hours.

The block copolymer in this invention may be produced, for example, by a method which comprises reacting the terminal groups of PPSS with terminal groups of PPS; a method which, when the terminal groups of PPSS are chlorophenyl group of the structure

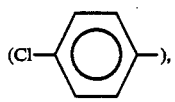

comprises converting the terminal groups of PPS into reactive groups such as sodium sulfide groups of the formula NaS-; a method which comprises adding a monomer constituting PPSS or PPS respectively to PPS having reactive terminal groups or PPSS having reactive terminal groups, and block copolymerizing them. The PPS having sodium sulfide terminal groups may be one obtained by reacting sodium sulfide monomer in a proportion of 1 to 20 mole % in excess of that of the p-dichlorobenzene at the time of polymerization.

The method of producing the block copolymer will be described more specifically.

The block copolymer may, for example, be produced by reacting a PPS prepolymer with a mixture of a dihalodiphenylsulfone and a sulfidization agent in an amide-type polar solvent, or reacting a PPSS prepolymer with a mixture of a polyhalogenated aromatic compound and a sulfidization agent.

The PPS prepolymer used in the above method preferably has a logarithmic viscosity [η](determined at 206° C. for its solution in alpha-chloronaphthalene in a polymer concentration of 0.4 g/100 ml of solution and calculated in accordance with the equation [η]=ln (relative viscosity)/polymer concentration) of 0.03 to 0.80.

Preferably, the PPS prepolymer has a sodium sulfide group and/or a chlorophenyl group at the molecular terminal.

PPS may be prepared by the same method as described hereinabove.

The PPSS prepolymer preferably has a logarithmic viscosity $\eta_{inh}$ (determined at 30° C. for its solution in a phenol/1,1,2,2-tetrachloroethane (3:2 by weight) mixed solvent in a polymer concentration of 0.5 g/100 ml of solution and calculated in accordance with the equation $\eta_{inh}$=ln relative viscosity)/polymer concentration) of 0.05 to 1.0.

Preferably, the PPSS prepolymer has a sodium sulfide group and/or a chlorophenyl group at its molecular terminal.

The PPSS prepolymer may be prepared by the method described hereinabove.

Now, a process for producing a block copolymer will be described, which comprises contacting a PPS prepolymer, synthesized in advance, with the dihalodiphenylsulfone as a monomer component of PPSS and the sulfidization agent in the optional presence of a polymerization aid.

In a preferred embodiment, this process is carried out by charging sodium sulfide, bis(4-chlorophenyl)sulfone and N-methylpyrrolidone into the polymerization reaction mixture containing the PPS prepolymer, and continuing the polymerization reaction to finally obtain a block copolymer or a mixture containing the copolymer.

The amount of the sulfidization agent used in the above copolymerization reaction is 0.8 to 1.2 moles, preferably 0.8 to 1.1 moles, as sulfur element, per mole of the dihalodiphenylsulfone. If the amount of the sulfidization agent is less than 0.6 mole or exceeds 1.2 moles, the molecular weight of the PPSS segments becomes too low, and finally, a copolymer of a low molecular weight results. Furthermore, the properties of the resulting copolymer are undesirably reduced. The sum of the amounts of the sulfidization agents used in the step of synthesizing the PPS prepolymer and the copolymerization step is preferably 0.8 to 1.2 moles, preferably 0.9 to 1.1 moles, per total moles of the polyhalogenated aromatic compound and the dihalodiphenylsulfone. In particular, to increase the reaction yield of the copolymerization and obtain a block copolymer having a relatively high molecular weight, it is preferred to react quantitatively a sodium sulfide group (structural formula: NaS-) or a chlorophenyl group (structural formula:

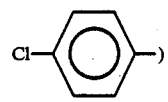

as a terminal group of the PPS prepolymer with the sulfidization agent and the dihalodiphenylsulfone. Preferably, the amount of the disulfidization agent used throughout the reaction is 0.95 to 1.05 based on the total proportion in moles of the halogen compound charged.

In the copolymerization reaction, the weight ratio of the PPSS segments and the PPS segments in the resulting block copolymer varies depending upon the desired properties, but is generally 1-99/99-1, preferably 5-90/95-10. If the weight ratio is less than 1/99, the effect of PPSS to improve toughness, etc. cannot be produced. On the other hand, if it exceeds 99/1, the desired effect of this invention cannot be obtained.

The amount of the organic amide-type polar solvent used is 2.5 to 20 times, preferably 3 to 10 times, the total amount in moles of the halogen compound and the dihalodiphenylsulfone used in the production of the PPS prepolymer. When the polymerization aid is added, its amount is 0.01 to 300%, preferably 0.5 to 200%, based on the weight of the dihalodiphenylsulfone used.

The temperature of the copolymerization reaction is generally 50° to 250° C., preferably 80° to 220° C. If this temperature is less than 50° C., the copolymerization hardly proceeds. If it exceeds 250° C., the copolymer is decomposed or gelled so that the desired copolymer cannot be obtained. The pressure is generally 0 to 200 kg/cm², preferably 0 to 20 kg/cm². The reaction time varies depending upon temperature and pressure. Generally, it is 10 minutes to about 72 hours, desirably 1 to 48 hours.

The second mode of the polymerization reaction comprising reacting the PPSS prepolymer with the mixture of the polyhalogenated aromatic compound and the sulfidization agent will be described.

In a preferred embodiment of this method, sodium sulfide, p-dichlorobenzene and N-methylpyrrolidone are charged into the polymerization reaction mixture containing the PPSS prepolymer and optionally a polymerization aid, and the polymerization reaction is continued to finally obtain a mixture containing a block copolymer.

In the above copolymerization reaction, the amount of the sulfidization agent used is 0.8 to 1.2 moles, preferably 0.9 to 1.1 moles, as sulfur element, per mole of the polyhalogenated aromatic compound. If it is less than 0.8 mole or exceeds 1.2 moles, the molecular weight of the PPS segments becomes too low, and finally only a copolymer having a low molecular weight is obtained. Furthermore, the properties of the copolymer are undesirably degraded. The sum of the amounts of the sulfidization agents used in the step of synthesizing the PPS prepolymer and the copolymerization step is preferably 0.8 to 1.2 moles, preferably 0.9 to 1.1 moles, per total moles of the polyhalogenated aromatic compound and the dihalodiphenylsulfone. In particular, to increase the reaction yield of the copolymerization and obtain a block copolymer having a relatively high molecular weight, it is preferred to react quantitatively a sodium sulfide group (structural formula: NaS-) or a chlorophenyl group (structural formula:

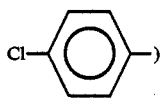

as a terminal group of the PPSS prepolymer with the sulfidization agent and the dihalodiphenylsulfone. Preferably, the amount of the disulfidization agent used throughout the reaction is 0.95 to 1.05 times the total proportion in moles of the halogen compound charged.

In the copolymerization reaction, the weight ratio of the PPS segments and the PPSS segments in the resulting block copolymer varies depending upon the desired properties. The weight ratio of PPSS segments to PPS segments is generally 1-99/99-1, preferably 5-90/95-10. If the weight ratio is less than 1/99, the effect of PPSS to improve toughness, etc. cannot be produced. On the other hand, if it exceeds 99/1, the desired effect of this invention cannot be obtained.

The polyhalogenated aromatic compound used in the above copolymerization reaction is selected from the polyhalogenated aromatic compounds exemplified hereinabove. Examples of the sulfidization agent used in the above copolymerization reaction may be the above-exemplified alkali metal sulfides and combinations of sulfur sources and alkali metal hydroxides. Sodium sulfide mono- to tri-hydrate and a mixture of sodium hydrosulfide and sodium hydroxide are preferred. The organic amide-type polar solvent is selected from those exemplified hereinabove, and N-methylpyrrolidone is especially preferred. The amount of the solvent used is 2.5 to 20 times, preferably 3 to 10 times, the amount in moles of the halogen compound charged. As required, polymerization aids may be added. The polymerization aids may be the same organic sulfonic acid metal salts, lithium halides, carboxylic acid metal salts and alkali salts of phosphoric acid exemplified hereinabove. The amount of the polymerization aid added is usually 0.01 to 300% by weight, preferably 0.5 to 200% by weight, based on the charged halogen compound.

The temperature of the above copolymerization reaction is generally 180° to 280° C., preferably 200° to 250° C. If this temperature is below 180° C., the copolymerization reaction hardly proceeds. If it exceeds 280° C., the copolymer is decomposed or gelled, and the desired copolymer cannot be obtained. The pressure is generally 1.1 to 200 kg/cm², preferably 1.1 to 20 kg/cm². The reaction time varies depending upon temperature and pressure. Generally, it is 10 minutes to about 72 hours, desirably 1 to 48 hours.

In the above method, it is preferred from the standpoint of simplification of the process and the reduction of the cost of production to use the polymerization reaction mixture containing the PPS prepolymer or the PPSS prepolymer subsequently in the second-stage copolymerization reaction. It is permissible however to recover only the prepolymer from the polymerization reaction mixture and use it in the copolymerization.

Another method of producing the block copolymer comprises contacting and reacting the PPS prepolymer and the PPSS prepolymer in an amide-type polar solvent. As a preferred embodiment, a suitable amount of the polymerization reaction mixture containing PPSS prepolymer obtained by the reaction of (4-chlorophenyl)sulfone and sodium sulfide in N-methylpyrrolidone is added to a separately prepared polymerization reaction mixture containing PPS prepolymer obtained by the reaction of p-dichlorobenzene and sodium sulfide in N-methylpyrrolidone, and the polymerization reaction is continued to finally obtain a mixture containing a block copolymer.

In carrying out this copolymerization reaction, the sum of the amounts of the sulfidization agents used in the steps of synthesizing the PPS and PPSS prepolymer is preferably 0.8 to 1.2 times, especially 0.8 to 1.1 times, the total amount in moles of the polyhalogenated aromatic compound and the dihalodiphenylsulfone. In particular, to increase the reaction yield of the copolymerization and obtain a block copolymer having a relatively high molecular weight, it is preferred to react quantitatively a sodium sulfide group (structural formula: NaS-) or a chlorophenyl group (structural formula:

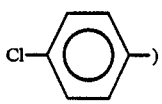

as a terminal group of the PPS prepolymer with the sulfidization agent and the dihalodiphenylsulfone. Preferably, the amount of the disulfidization agent used throughout the reaction is 0.95 to 1.05 times the total proportion in moles of the halogen compound charged. In order to maintain the amount of the sulfidization agent within the above range, at least one of the sulfidization agent, polyhalogenated aromatic compound and dihalodiphenylsulfone as monomer components may be added in the stage of the copolymerization.

In the copolymerization reaction, the weight ratio of the PPS segments and the PPSS segments in the resulting block copolymer varies depending upon the desired properties. The weight ratio of PPSS segments to PPS segments is generally 1-99/99-1, preferably 5-90/95-10. If the weight ratio is less than 1/99, the effect of PPSS to improve toughness, etc. cannot be produced. On the other hand, if it exceeds 99/1, the desired effect of this invention cannot be obtained.

The organic amide-type polar solvent used in the above copolymerization is selected from the solvents mentioned hereinabove, and N-methylpyrrolidone is preferred The amount of the solvent used is 2.5 to 20, preferably 3 to 10, times the total amount in moles of the halogen compound charged. As required, a polymerization aid may be added. Examples of the polymerization aid are the metal salts of organic sulfonic acids, lithium halides, carboxylic acid metal salts and alkali salts of phosphoric acid already cited hereinabove. The amount of the polymerization aid added 0.01 to 300% by weight, preferably 0.5 to 200% by weight, based on the charged halogen compound.

The copolymerization temperature is generally 50 to 250° C., preferably 80° to 220° C. If this temperature is below 50° C., the copolymerization reaction hardly proceeds. If it exceeds 250° C., the copolymer is decomposed or gelled so that the desired copolymer of this invention cannot be obtained. The pressure is generally selected from 9 to 200 kg/cm$^2$, preferably 0 to 20 kg/cm$^3$. The reaction time varies depending upon temperature and pressure, and is generally 10 minutes to about 72 hours, desirably 1 to 48 hours.

In this method, it is preferred from the standpoint of simplification of the process and the reduction of the cost of production to use the polymerization reaction mixture containing the PPS prepolymer or the PPSS prepolymer subsequently in the second-stage copolymerization reaction. It is permissible however to recover only the prepolymer from the polymerization reaction mixture and use it in the copolymerization.

The resulting block copolymer or a polymeric mixture containing it may be isolated in a customary manner from the polymerization reaction mixture in any of the methods described above. For example, the reaction mixture may be distilled or flashed to remove the solvent, and then the residue is washed with a poor solvent such as acetone or methanol to obtain the purified polymer.

That the copolymerization reaction produced in any of the above production methods is a copolymer composed of PPS and PPSS segments chemically bonded to each other can be determined by the fact that when it is repeatedly extracted with a phenol/tetrachloroethane (3:2 by weight) which is a good solvent for PPSS until no PPSS homopolymer is present in the extract, the reaction product still contains this component. On the other hand, whether the polymer contains the unreacted PPS can be determined by fractional precipitation of the polymer using alpha-chloronaphthalene which is a good solvent for PPS.

The present invention also provides a resin composition comprising the aforesaid block copolymer and at least one polymer selected from polyphenylene sulfide, polyphenylene sulfide sulfone, polysulfone, polyphenylene oxide, polyarylates, polycarbonates and polyether imide, and optionally a filler.

Preferably, 3 to 100 parts of the block copolymer is used per 1 to 97 parts by weight of the other polymer. In particular, when PPS is used in combination, its amount is 1 to 97 parts by weight, preferably 10 to 90 parts by weight, per 3 to 100 parts, preferably 10 to 100 parts by weight, of the block copolymer. When PPSS is used in combination, its amount is 1 to 60 parts by weight, preferably 10 to 40 parts by weight, per 3 to 100 parts by weight, preferably 10 to 100 parts by weight, of the block copolymer.

The above PPS and PPSS used in combination may be those which are obtained by the methods of producing PPS and PPSS which constitute the block copolymer. They can also be obtained by reacting an excessive amount of materials for forming PPS or PPSS in the production of the block copolymer. The inclusion of PPS and PPSS may be determined by the fact that when the polymer is repeatedly extracted with N-methylpyrrolidone or a mixture of phenol and tetrachloroethane which is a good solvent for PPSS, the polymer still contains a certain fixed amount of PPSS. On the other hand, whether the copolymer contains PPS homopolymer can be determined by fractional distillation using alpha-chloronaphthalene. By the above method, a resin composition comprising the block copolymer and PPS and/or PPSS can be obtained. Of course, these components may be separately prepared and mixed to form the resin composition.

The polysulfone used in this invention is defined as a polyarylene compound in which arylene units exist irregularly or regularly together with ether and sulfone linkages. Examples are compounds of the following structural formulae (1) to (16) where n is an integer of at least 10. The compounds having a structural formulae (1) and (6) are preferred.

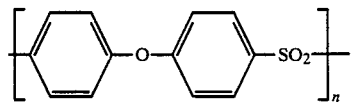

(1)

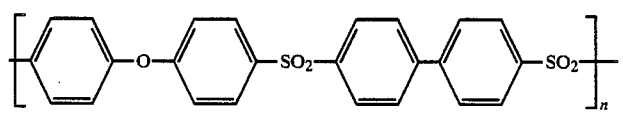
(2)
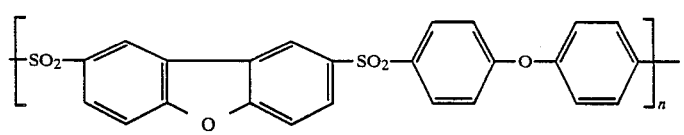
(3)
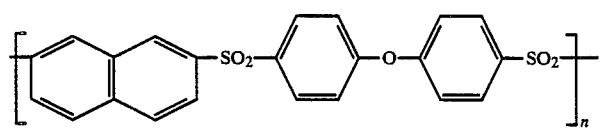
(4)
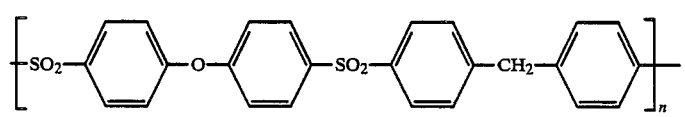
(5)
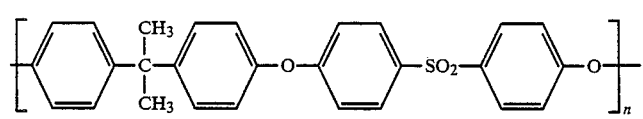
(6)
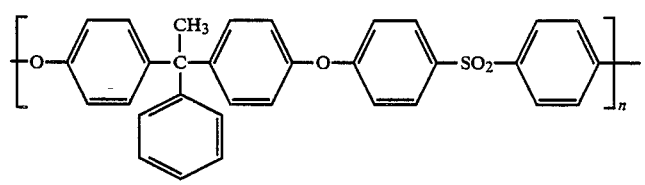
(7)
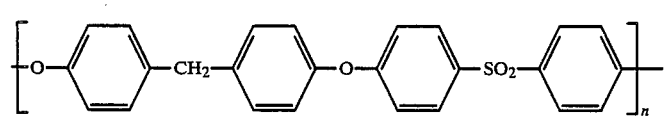
(8)
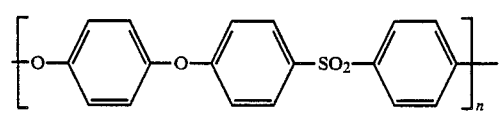
(9)
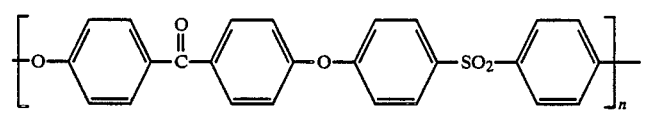
(10)
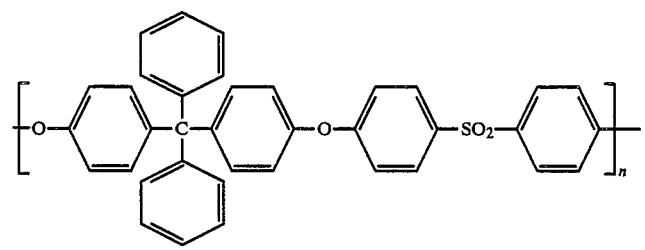
(11)
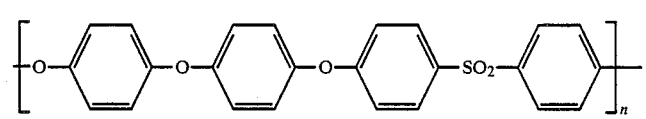
(12)

-continued

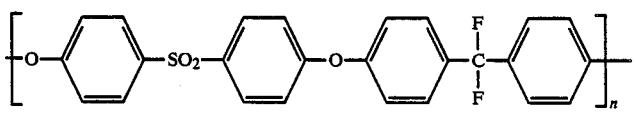 (13)

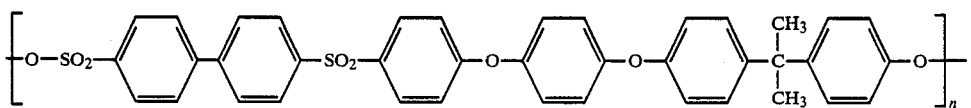 (14)

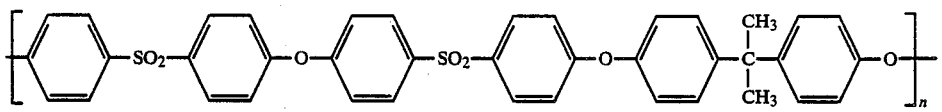 (15)

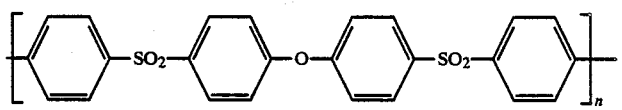 (16)

Polyphenylene oxide is also called polyphenylene ether, and may, for example, be a 2,6-disubstituted phenol polymer represented by the following general formula [I]

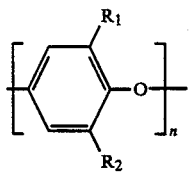 [I]

wherein $R_1$ and $R_2$ represent hydrogen, halogen, an alkyl, haloalkyl or alkoxy group having not more than 4 carbon atoms, an allyl derivative having not more than 9 carbon atoms, or an aralkyl group, and n represents the number of recurring units and is an integer of at least 10,
or a polymer of the 2,6-disubstituted phenol and a polyhydric phenol (see Japanese Patent Application No. 24265/1974). It usually has a molecular weight of at least 2,000, preferably 10,000 to 35,000.

Such a resin is generally produced by subjecting a phenol such as phenol, 2,6-dimethylphenol, 2,6-diethylphenol, 2,6-diisopropylphenol or 2-methyl-6-methoxyphenol to dehydration reaction with oxygen in the presence of a co-catalyst such as a metal amine or a metal chelate/basic organic compound. Any resins meeting the aforesaid requirements may be used irrespective of the method of production. Specific examples include 2,6-dimethylphenylene oxide polymer, 2,6-dimethylphenol/bisphenol A (95/5 moles) copolymer, and 2,6-diethyl phenylene oxide polymer. PPO having styrene grafted thereto may also be used.

The polyarylate is a polyester synthesized from bisphenol or its derivative and a dibasic acid or its derivative. Examples of the bisphenol include 2,2-bis-(4-hydroxyphenyl)propane, 4,4'-dihydroxy-diphenyl ether, 4,4'-dihydroxy-3,3'-dimethyldiphenyl ether, 4,4'-dihydroxy-3,3'-dichlorodiphenyl ether, 4,4'-dihydroxydiphenylsulfide, 4,4'-dihydroxy-diphenylsulfone, 4,4'-dihydroxy-diphenylketone, bis-(4-hydroxyphenyl)methane, 1,1-bis-(4-hydroxyphenyl)ethane, 1,1-bis-(4-hydroxyphenyl)-n-butane, di-(4-hydroxyphenyl)-cyclohexyl-methane, 1,1-bis-(4-hydroxyphenyl)-2,2,2-trichloroethane, 2,2-bis-(4-hydroxy-3,5-dibromophenyl)propane, and 2,2-bis-(4-hydroxy-3,5-dichlorophenyl)propane. The 2,2-bis(4-hydroxyphenyl)propane, called bisphenol A, is especially preferred.

Examples of the dibasic acid include aromatic carboxylic acids such as phthalic acid, isophthalic acid, terephthalic acid, bis-(4-carboxy)-diphenyl, bis-(4-carboxyphenyl)-ether, bis-(4-carboxyphenyl)-sulfone, bis-(4-carboxyphenyl)-carbonyl, bis-(4-carboxyphenyl)methane, bis-(4-carboxyphenyl)-dichloromethane, 1,2- and 1,1-bis-(4-carboxyphenyl)-ethane, 1,2- and 2,2-bis-(4-carboxyphenyl)-propane, 1,2- and 2,2-bis-(3-carboxyphenyl)-propane, 2,2-bis-(4-carboxyphenyl)-1,1-dimethylpropane, 1,1- and 2,2-bis-(4-carboxyphenyl)-butane, 1,1- and 2,2-bis-(4-carboxyphenyl)-pentane, 3,3-bis-(4-carboxyphenyl)-heptane, and 2,2-bis-(4-carboxyphenyl)-heptane; and aliphatic dicarboxylic acids such as oxalic acid, adipic acid, succinic acid, malonic acid, sebacic acid, glutaric acid, azelaic acid and suberic acid. Of these, isophthalic acid and terephthalic acid or mixtures of derivatives of these are preferred.

Homopolycarbonate or polycarbonate copolymers based on at least one bisphenol may be used as the polycarbonate in this invention.

Examples of the bisphenol are hydroquinone, resorcinol, dihydroxydiphenyl, bis-(hydroxyphenyl)alkanes, bis-(hydroxyphenyl)cycloalkanes, bis-(hydroxyphenyl)-sulfide, bis-(hydroxyphenyl)ketone, bis-(hydroxyphenyl)ether, bis-(hydroxyphenyl)sulfoxide, bis-(hydroxyphenyl)sulfone and α,α'-bis-(hydroxyphenyl)-diisopropylbenzene, and derivatives thereof resulting from substitution of alkyl or halogen at the ring. Specific examples of suitable bisphenols include 4,4-dihydroxydiphenyl, 2,2-bis(4-hydroxyphenyl)propane, 2,4-bis-(4-hydroxyphenyl)-2-methylbutane, 1,1-bis-(4-hydroxyphenyl)cyclohexane, α,α'-bis-(4-hydroxyphenyl)-p-diisopropylbenzene, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl)-sulfone, 2,4-bis-(3,5-dimethyl-4-hydroxyphenyl)-2-mercaptan, 1,1-bis-(3,5-dimethyl-4-hydroxyphenyl)cyclohexane, α,α'-bis-(3,5-dimethyl-4-hydroxyphenyl)-p-diisopropylbenzene, 2,2-bis-(3,5-dichloro-4-hydroxyphenyl)propane and 2,2-bis-(3,5-dibromo-4-hydroxyphenyl)propane. Of these, 2,2-bis-(4-hydroxyphenyl)-propane, 2,2-bis-(3,5-dimethyl-4-hydroxyphenyl)propane, 2,2-bis-(3,5-dichloro-4-hydroxyphenyl)propane, 2,2-bis-(3,5-dibromo-4-hydroxyphenyl)propane and 1,1-bis-(4-hydroxyphenyl)cyclohexane are preferred.

Preferred polycarbonates are those based on the aforesaid preferred bisphenols. Especially preferred polycarbonate copolymers are copolymers of 2,2-bis-(4-hydroxyphenyl)propane and one of the other preferred bisphenols.

Especially preferred polycarbonates are based only on 2,2-bis-(4-hydroxyphenyl)propane or 2,2-bis-(3,5-dimethyl-4-hydroxyphenyl)propane.

The polyether imide may be obtained by reacting an aromatic bis(ether acid anhydride) of the following formula

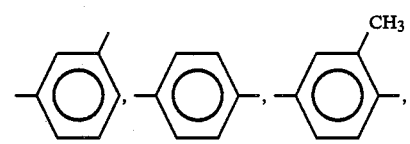

wherein $R_1$ is

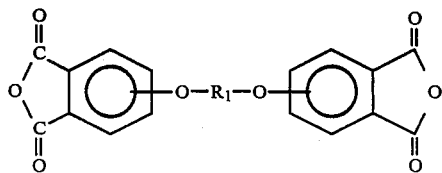

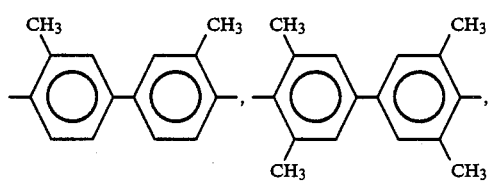

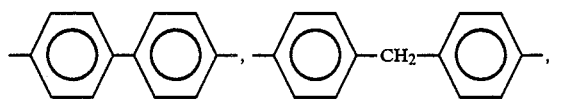

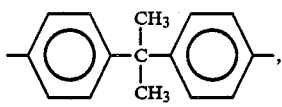

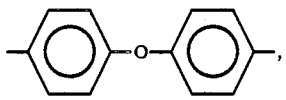

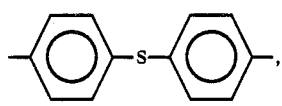

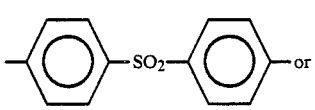 or

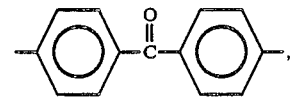

with an organic diamine of the formula $$H_2N-R_2-NH_2$$

wherein $R_2$ is

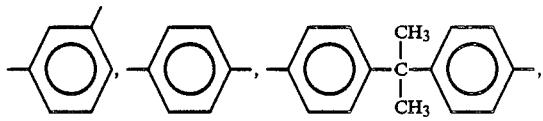

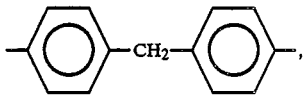

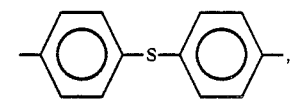

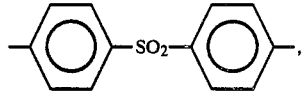

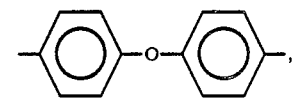

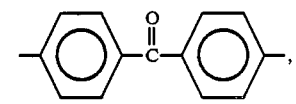

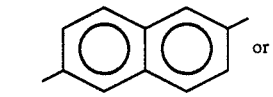 or

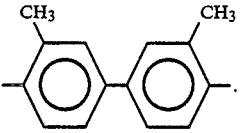

Such polyether imides can be produced by the method described, for example, in U.S. Pat. Nos. 3,833,544, 3,887,588 and 4017511.

The composition of this invention comprises 95 to 35 parts by weight, preferably 90 to 40 parts by weight, of (a) the block copolymer and 5 to 70 parts by weight, preferably 10 to 60 parts by weight, of (b) at least one polymer selected from polysulfones, polyphenylene oxides, polyarylates, polycarbonates and polyether imides. If the proportion of (a) exceeds 95 parts by weight, the improving effect intended by the invention is small. If it is less than 30 parts by weight, the inherent properties of the block copolymer tend to be lost.

As required, an inorganic filler may be incorporated in the composition of this invention. Examples of the filler include fibrous reinforcing agents such as glass fibers, carbon fibers, potassium titanate, asbestos, silicon carbide, ceramic fibers, metal fibers, silicon nitride and aramid fibers; and inorganic fillers such as barium sulfate, calcium sulfate, kaolin, clay, pyrophyllite, bentonite, sericite, zeolite, mica, nepheline syenite, talc, attapulgite, wollastonite, PMF, ferrite, calcium silicate, calcium carbonate, magnesium carbonate, dolomite, antimony trioxide, zinc oxide, titanium oxide, magnesium oxide, iron oxide, molybdenum disulfide, graphite, gypsum, glass beads, glass balloons, and quartz powder. The amount of the filler to be incorporated in the composition is usually 70% by weight based on the composition. These fillers may be used in combination with known silane coupling agents.

The composition of this invention may contain an epoxy resin, a releasing agent, a coloring agent, a heat stabilizer, an ultraviolet stabilizer, a blowing agent, a fire retardant, a fire retardant aid, a rust inhibitor, etc. in amounts which do not depart from the objectives of this invention. Likewise, other polymers may also be incorporated in the composition. Examples of the other polymers include homopolymers or copolymers of monomers such as ethylene, butylene, pentene, butadiene, isoprene, chloroprene, styrene, alpha-methylstyrene, acrylic esters, methacrylic esters and (meth)acrylonitrile, and modification products of such polymers or copolymers; polyesters such as polyethylene terephthalate and polybutylene terephthalate (so-called liquid crystalline polymers such as wholly aromatic polyesters); polyamides; polyether ether ketones; polyimides; polyamideimides; silicone resins; phenoxy resins; fluorine resins; and thermoplastic elastomers such as polyamide elastomers and hydrogenated conjugated dienes/styrene copolymers.

The composition of this invention may be prepared by various known methods. For example, the raw materials for the composition are uniformly mixed in a mixer such as a tumbler or a Henschel mixer, and the mixture is then fed into a single-screw or twin-screw extruder and melt-kneaded at 230° to 400° C. and then extruded as pellets.

The composition of this invention has good compatibility and excellent mechanical strength and thermal stability. It can be used not only in the production of injection-molded and compression-molded articles, such as electric and electronic component parts, which are the main use of conventional polyphenylene sulfides, but also for the production of extrusion-molded articles, blow-molded articles transfer molded articles, etc., such as fibers, sheets, films, and tubes.

In particular, a resin composition comprising the block copolymer, at least one polymer selected from polyphenylene sulfides, polyphenylene sulfide sulfones, polysulfones, polyphenylene oxides, polyarylates, polycarbonates and polyether imides, preferably at least one polymer selected from polyphenylene sulfides and polysulfones, and the inorganic filler and having a melt viscosity at 320° C. of 200 to 2,000 poises (orifice: diameter 1 mm, length 2 mm; load 10 kg) is useful for encapsulation of electronic component parts.

A preferred formulation of the above encapsulating composition comprises 100 parts by weight of the block copolymer, not more than 50,000 parts by weight of PPS and not more than 10,000 parts by weight of polysulfone. Preferably, the inorganic filler is incorporated in the encapsulating resin composition in an amount of 30 to 75% by weight. If its amount exceeds 75% by weight, the melt viscosity of the composition becomes high. If it is less than 30% by weight, the composition does not show satisfactory strength and thermal stability.

The encapsulating resin composition should have a melt viscosity which does not damage electronic component parts. The preferred melt viscosity is 200 to 2,000 poises at 320° C. (orifice: diameter 1 mm, length 2 mm; load 10 kg). If the viscosity exceeds 2,000 poises, stresses on electronic component parts are great. If it is less than 200 poises, it is necessary to lower the molecular weight of the resin component drastically. This undesirably results in a drastic decrease in strength.

The encapsulating resin composition in accordance with this invention may contain suitable amounts of known additives, such as a silane coupling agent, a titanate type coupling agent, rubber, elastomers, a heat stabilizer, an antioxidant, a corrosion inhibitor, a flowability improver and a coloring agent.

The encapsulating resin composition in accordance with this invention has improved toughness, adhesion to metals and flowing characteristics over a known encapsulating composition comprising only PPS. Hence, the performance and reliability of electronic components encapsulated by the resin composition of this invention can be enhanced.

The following examples specifically illustrate the present invention. It should be understood however that the invention is not limited to them.

EXAMPLE 1 AND COMPARATIVE EXAMPLES 1-2

(A) Chlorophenyl group-terminated PPSS was synthesized by the following procedure. A 10-liter autoclave was charged with 1,980 g of N-methylpyrrolidone, 655 g (5.0 mole) of sodium sulfide 2.7-hydrate, 2.0 g of sodium hydroxide and 1436 g (5.0 moles) of bis(p-chlorophenyl)sulfone. In an atmosphere of nitrogen, these materials were heated to 200° C., and reacted at this temperature for 6 hours with stirring. To the reaction mixture was added a solution of 72 g (0.25 mole) of bis(p-chlorophenyl)sulfone in 200 g of N-methyl pyrrolidone, and the mixture was further reacted for 1 hour. After the reactor was cooled, the contents were taken out, and washed several times with hot water and acetone. The polymer cake was collected by filtration, dried under reduced pressure at 80° to 150° C. to give 1190 g of a pale brown polymer (yield 96%). This polymer had a logarithmic viscosity $\eta_{inh}$, defined hereinabove, of 0.22

(B) Sodium sulfide group-terminated PPS was synthesized by the following procedure. A 10-liter autoclave was charged with 3100 g of N-methylpyrrolidone, 1009 g (7.7 moles) of sodium sulfide 2.7-hydrate and 3.5 g (0.09 mole) of sodium hydroxide. In an atmosphere of nitrogen, the temperature was elevated to 200° C. over the course of about 2 hours with stirring, and 220 ml of water was distilled out. The reaction mixture was cooled to 150° C., and 1029 g (7.0 moles) of p-dichlorobenzene and 700 g of N-methylpyrrolidone were added, and reacted at 230° C. for 1.5 hours and then at 260° C. for 2 hours. The pressure inside the autoclave at the end of polymerization was 7.0 kg/cm². The reactor was cooled, and part of the contents was sampled. It was filtered, and the cake was washed with boiling water three times and then with acetone twice, and dried at 120° C. to give a PPS polymer as a pale grayish brown powder (yield about 94%). This polymer had a logarithmic viscosity [η], as defined hereinabove, of 0.14.

(C) Subsequently, 300 g of the chlorophenyl group-terminated PPSS and 1200 g of N-methylpyrrolidone were added to 2370 g of the PPS polymerization mixture in the reactor. The reactor was purged with nitrogen and then sealed up and heated to 220° C. The mixture were reacted at this temperature for 3 hours. The reactor was cooled, and the contents were filtered. The solid component was washed two times with N-methylpyrrolidone and three times with boiling hot water. The resulting cake was dried at 120° C. for 5 hours, and then dispersed in a mixed solvent of phenol and 1,1,2,2-tetrachloroethane (3:2 by weight), and the unreacted PPSS was extracted at 100° C. By repeating this operation three times, PPSS was no longer extracted. The cake obtained after the extraction was fully washed with acetone, dried, and then subjected to fractional distillation at 210° C. using alpha-chloronaphthalene to separate the unreacted PPS by filtration. The resulting cake was fully washed with acetone, and dried at 120° C. for 5 hours to give 486 g of a pale brown powdery polymer having an [η] of 0.19.

Infrared absorption spectroscopy of this polymer showed that peaks other than those assigned to PPS and PPSS were not observed. The quantity of PPSS was determined on the basis of the intensities of characteristic absorptions seen at 1320 $cm^{-1}$, 620 $cm^{-1}$ and 480 $cm^{-1}$. It was found that the content of PPSS in the polymer was 46.0% by weight. The polymer was subjected to elemental analysis, and its sulfur content was found to be 27.87%. It was thus determined that PPSS was contained in an amount of 46.0% by weight in the polymer.

A blend of PPS and PPSS with a PPSS content of 46.0% by weight was subjected to the above extraction experiment with a phenol/tetrachloroethane mixed solvent and fractional distillation with alpha-chloronaphthalene. PPS and PPSS could be completely separated and recovered.

The copolymerization reaction product in this example was further analyzed by DSC (differential scanning calorimeter), and a crystalization peak (192° C.) was observed during cooling after fusion. From this it was determined that the copolymer maintained crystallinity based on the PPS segments.

The above results led to the determination that the above copolymerization reaction product was a block copolymer in which PPS and PPSS were chemically bonded.

The copolymer was heat-treated at 260° C. for 5 hours, and then heat-kneaded and pelletized in a 30 mm twin-screw extruder. The pellets were injection molded at 330° C. to prepare test pieces. Melt flow index (MI value for short) (by the method of ASTM D-1238, 315° C., 5 kg load), flexural strength (by the method of ASTM D-790), and Izod impact strength (by the method of ASTM D-256) were measured. Compatibility by appearance was evaluated by observing the appearance of the test piece visually. The peeling state of the molded article was tested by applying an adhesive tape to a fractured surface of the test piece, then removing it, and observing the state of that surface with the naked eyes.

In Comparative Example 1, PPSS synthesized in this example was mixed with a PPS powder obtained by treating the PPS polymerization reaction mixture by the method described above to prepare a mixture with a PPSS content of 46.0% by weight. Test pieces were prepared from the mixture by the above method, and their properties were measured.

In Comparative Example 2, test pieces were prepared from PPS powder obtained by the same method as in the present example, and their properties were measured.

The results are shown in Table 1.

TABLE 1

| Properties | Example 1 PPS/PPSS block copolymer | Comparative Example 1 PPS/PPSS mixture | Comparative Example 2 PPS |
|---|---|---|---|
| MI value (g/10 min.) | 58 | 96 | 104 |
| Flexural strength ($kg/cm^2$) | 750 | 440 | 310 |
| Izod impact strength (unnotched; kg-cm/cm) | 14.0 | 5.6 | 1.5 |
| Compatibility by appearance | good | poor | — |
| Peeling of the molded article | no | yes | — |

As seen from Table 1, the block copolymer has a lower MI value than the PPS or the PPS/PPSS mixture, and this shows an increase in melt viscosity owing to the block copolymerization. From the appearance and the peeled state of the molded article, it is presumed that the copolymer had good dispersibility, and microphase separation occurred. The block copolymer had much increased flexural strength and impact strength over the polymer mixture, and this shows that the block copolymer had improved impact strength.

EXAMPLE 2 AND COMPARATIVE EXAMPLES 3–4

The block copolymer obtained in Example 1 was heat-treated at 260° C. for 7 hours, and 50 parts of the heat-treated copolymer was mixed with 50 parts by weight of PPS (RYTON P-4, a product of Phillips Petroleum Co., U.S.A.). The mixture was kneaded and pelletized using a 30 mm twin-screw extruder. The pellets were injection-molded at 330° C. to form test pieces. The MI value, flexural strength, Izod impact strength, compatibility by appearance and peeling state of the molded article were measured and determined on the test pieces by the same methods as in Example 1.

In Comparative Example 3, test pieces were prepared by the above method from a blend of 50 parts by weight of a mixture of the PPSS and PPS powder synthesized in Example 1 (PPSS content of 48.0% by weight and 50 parts by weight RYTON P-4), and their properties were measured.

In Comparative Examples, test pieces were prepared only from the PPS powder prepared as in Example 1, and their properties were measured.

The results are shown in Table 2.

TABLE 2

| Properties | Example 2 PPS/PPSS block copolymer | Comparative Example 3 PPS/PPSS mixture | Comparative Example 4 PPS |
|---|---|---|---|
| MI value (g/10 min.) | 63 | 90 | 102 |
| Flexural strength ($kg/cm^2$) | 750 | 370 | 310 |
| Izod impact strength (unnotched; | 7.0 | 2.3 | 1.5 |

TABLE 2-continued

| Properties | Example 2 PPS/PPSS block copolymer | Comparative Example 3 PPS/PPSS mixture | Comparative Example 4 PPS |
|---|---|---|---|
| kg-cm/cm) | | | |
| Compatibility by appearance | good | poor | — |
| Peeling of the molded article | no | yes | — |

The composition of this invention has a decreased MI value as compared with PPS alone or the PPS/PPSS mixture, and this shows the increase of melt viscosity as a result of including the block copolymer. From appearance and the peeling state of the molded article, it is presumed that the block copolymer has good dispersibility and microphase separation is induced. Hence, the composition of this invention has much increase flexural strength and impact strength as compared with the mixture, and thus has improved impact strength.

EXAMPLE 3

The block copolymer obtained in Example 1 was heat-treated at 260° C. for 7 hours, and 80 parts by weight of the heat-treated copolymer was mixed with 20 parts of PPSS synthesized in Example 1. The mixture was pelletized and injection molded to form test pieces as in Example 2. The properties of the test pieces were measured as in Example 2. The results are shown in Table 3.

EXAMPLE 4

A sodium sulfide group-terminated PPS polymer was synthesized by the same method as in Example 1 except that 1629 g (8.0 moles) of sodium p-toluenesulfonate was added together with sodium sulfide. Part of the polymerization product was sampled and its [η] was found to be 0.31.

The polymerization product (3740 g), 210 g of chlorophenyl group-terminated PPS ($\eta_{inh}$=0.26) synthesized by the same method as in Example 1 and 800 g of N-methylpyrrolidone were mixed in a reactor. The inside of the reactor was purged with nitrogen and then sealed up. The temperature was elevated to 220° C. and the mixture was reacted at this temperature for 3 hours. The reaction product was worked up in the same way as in Example 1 to give a grayish brown powdery polymer having an [η] of 0.34. The infrared absorption spectrum measured of the polymer showed that it contained 28.5% by weight of PPSS. When the copolymer was subjected to the extraction test described in Example 1, homopolymers of PPS and PPSS were hardly recovered. This led to the determination that most of the polymer obtained in this example is a block copolymer.

Twenty parts by weight of the block copolymer, 68 parts by weight of PPS (RYTON P-4) and 12 parts by weight of PPSS obtained in this example were mixed, and injection molded to form test pieces as in Example 2. The properties of the test pieces were measured, and the results are shown in Table 3.

EXAMPLE 5 AND COMPARATIVE EXAMPLE 5

The block copolymer obtained in Example 1 was heat-treated at 260° C. for 7 hours, and 24 parts by weight of the heat-treated copolymer, 36 parts by weight of PPS (RYTON P-4) and 40 parts by weight of commercial glass fibers (OS-03MA419, made by Asahi Fiber Glass Co.) were mixed. The mixture was kneaded and pelletized by a twin-screw extruder, and injection molded at 330° C. to prepare test pieces.

In Comparative Example 5, test pieces were prepared as above except that a mixture of PPS and PPSS obtained in Example 1 with a PPSS content of 18.4% by weight was used instead of the resin component in this example.

The properties of the test pieces were measured as in Example 1.

The results are shown in Table 3.

As shown in Table 3, the copolymer composition in accordance with this invention showed good results in flexural strength and impact strength even when glass fibers were incorporated in it.

EXAMPLE 6

Chlorophenyl group-terminated PPSS ($\eta_{inh}$=0.51) was synthesized by the same method as in Example 1 except that as a polymerization catalyst, lithium acetate dihydrate was used in an equimolar proportion to sodium sulfide. Separately, sodium sulfide group-terminated PPS polymerization reaction product was synthesized by the same method as in Example 1 except that an equimolar proportion of sodium acetate was added together with sodium sulfide. Part of the PPS polymerization reaction product was sampled and its [η] was found to be 0.30. By copolymerizing the PPS polymerization mixture and PPSS, a powdery polymer having an [η] of 0.39 was prepared. This polymer was a composition composed of 46% by weight of the PS/PPSS block copolymer component and 54% by weight of the PPS component.

The copolymer composition so obtained was pelletized and injection-molded to form test pieces. The properties of the test pieces were measured. The results are shown in Table 3.

EXAMPLE 7

Forty parts by weight of the copolymer composition obtained in Example 6 was mixed with 30 parts by weight of commercial glass fibers and 30 parts of calcium carbonate, and test pieces were prepared from the mixture as above. The properties of the test pieces were likewise measured.

The results are shown in Table 3.

TABLE 3

| Properties | Example 3 PPS/PPSS block copolymer composition | Example 4 PPS/PPSS block copolymer composition | Example 5 PPS/PPSS block copolymer composition (60) + glass fibers (40) | Comp. Example 5 PPS/PPSS mixture (60) + glass fibers (40) | Example 6 PPS/PPSS block copolymer composition | Example 7 PPS/PPSS block copolymer composition (40) + glass fibers (30) + CaCO$_3$ (30) |
|---|---|---|---|---|---|---|
| MI value (g/10 min.) | 35 | 63 | 28 | 40 | 21 | 11 |
| Flexural strength (kg/cm$^2$) | 910 | 670 | 1760 | 1200 | 1050 | 1420 |
| Izod impact strength (unnotched, kg-cm/cm) | 11.8 | 8.2 | 25.0 | 15.6 | 18.1 | 17.3 |
| Compatibility by appearance | Good | Good | Good | Poor | Good | Good |
| Peeling of the molded article | No | No | No | Yes | No | No |

EXAMPLES 8–12 AND COMPARATIVE EXAMPLES 6–8

In each run, 9480 g of the sodium sulfide group-terminated PPS obtained in Example 1, 300 g of chlorophenyl group-terminated PPSS obtained in Example 1 and 1200 g of N-methylpyrrolidone were introduced into a reactor. The inside of the reactor was purged with nitrogen, and the reactor was sealed up. The temperature was raised to 220° C., and the above mixture was reacted at this temperature for 3 hours. The reactor was cooled, and the contents were filtered. The solid component separated was washed two times with N-methylpyrrolidone, and washed three times with boiling water. The resulting cake was dried at 120° C. for 5 hours, and dispersed in a mixture of phenol and 1,1,2,2-tetrachloroethane (3:2 by weight), and the unreacted PPSS was extracted and removed at 100° C. By repeating this operation three times, PPSS was no longer extracted. The cake obtained after the extraction, was fully washed with acetone, and subjected to fractional precipitation at 210° C. using alpha-chloronaphthalene, and only the unreacted PPS alone was separated by filtration. The resulting cake was washed fully with acetone, and dried at 120° C. for 5 hours to give 1275 g of a pale brown powdery polymer (block copolymer). The polymer had a [η] of 0.18, and a PPSS content of 18% by weight.

The above procedure was repeated except that the amount of PPS was changed to 3555 g and 1330 g. As a result, 638 g and 353 g of polymers having an [η] of 0.17 and 0.15 were obtained. The PPSS content of the polymers was 37% by weight and 69% by weight.

Each of the resulting PPS-PPSS block copolymers was crosslinked under heat in air at 260° C. for a predetermined period of time to give a copolymer having a melt index of 180 at 316° C. under a load of 5 kg. The crosslinked copolymer having a PPSS content of 18% by weight is designated as I; those having a PPSS content of 37% by weight, as II; and that having a PPSS content of 69% by weight, as III.

Each of the PPS-PPSS block copolymers and polysulfone (P-1700, a product of Nissan Chemical Co., Ltd.) were uniformly mixed in the proportions indicated in Table 4. The mixture was melt-kneaded and pelletized at 330° C. using a 40 mm extruder.

The pellets were injection molded to prepare test pieces. The compositions of the PPS-PPSS block copolymers and the polysulfone had good appearance and compatibility. On the other hand, the composition of PPS and the polysulfone in Comparative Example 6 had a pearlescent appearance and showed poor compatibility.

The properties of the test pieces were measured, and the results are shown in Table 4. It is seen from Table 4 that the use of the PPS-PPSS block copolymer gives molded articles having good strength and heat distortion temperatures.

TABLE 4

| | Ex. 8 | Ex. 9 | Ex. 10 | Ex. 11 | Ex. 12 | C Ex. 6 | C Ex. 7 | C Ex. 8 |
|---|---|---|---|---|---|---|---|---|
| PPS-PPSS copolymer | | | | | | | | |
| Type | II | II | I | III | II | — | — | — |
| Amount (parts by weight) | 80 | 60 | 60 | 60 | 40 | — | — | — |
| PPS (RYTON PR-06) (parts by weight) | — | — | — | — | — | 60 | 100 | — |
| Polysulfone (parts by weight) | 20 | 40 | 40 | 40 | 60 | 40 | — | 100 |
| Compatibility by the appearance of the molded article | Good | Good | Good | Good | Good | Poor | Good | Good |
| Flexural strength (kg/cm$^2$) | 1270 | 1320 | 1280 | 1350 | 1260 | 1000 | 800 | 1100 |
| Izod impact strength (unnotched) (kg.cm/cm) | 8 | 15 | 13 | 18 | 28 | 10 | 4.0 | No break |
| Heat distortion temperature (18.6 kg/cm$^2$) (°C.) | 148 | 168 | 164 | 174 | 173 | 156 | 115 | 175 |

EXAMPLES 13-27 AND COMPARATIVE EXAMPLES 9-15

The blends shown in Tables 5, 6, 7, 8 and 9 were each extruded at 330° C. to form pellets, and test pieces were prepared from the pellets. The results are shown in Tables 5, 6, 7, 8 and 9.

TABLE 5

| | Ex. 13 | Ex. 14 | Ex. 15 | C Ex. 9 | C Ex. 10 | C Ex. 11 |
|---|---|---|---|---|---|---|
| PPS-PPSS copolymer | | | | | | |
| Type | II | II | II | — | — | — |
| Amount (parts by weight) | 48 | 36 | 12 | — | — | — |
| PPS (RYTON PR-06) | — | — | — | 36 | 60 | — |
| Polyether sulfone (Victrex 200P, a product of ICI) | 12 | 24 | 48 | 24 | — | 70 |
| Glass fibers (Glasslon CS03MA411, a product of Asahi Glass Fiber Co.) | 40 | 40 | 40 | 40 | 40 | 30 |
| Compatibility by the appearance of the molded article | Good | Good | Good | Poor | Good | Poor |
| Flexural strength (kg/cm$^2$) | 2450 | 2300 | 2100 | 1700 | 2100 | 1900 |
| Izod impact strength (unnotched) (kg.cm/cm) | 41 | 45 | 50 | 28 | 35 | 55 |
| Heat distortion temperature (18.6 kg/cm$^2$) (°C.) | 210 | 213 | 215 | 245 | 260< | 216 |
| Flexural modulus at 130° C. | $12 \times 10^4$ | $11 \times 10^4$ | $10.5 \times 10^4$ | $8.5 \times 10^4$ | $7 \times 10^4$ | $8 \times 10^4$ |

TABLE 6

| | | Ex. 16 | Ex. 17 | Ex. 18 | CEx. 12 |
|---|---|---|---|---|---|
| PPS-PPSS copolymer | Type | II | II | II | — |
| | Amount (parts by weight) | 80 | 60 | 40 | — |
| PPS (RYTON PR-06) | | — | — | — | 60 |
| Polyphenylene oxide (*) | | 20 | 40 | 60 | 40 |
| Compatibility by the appearance of the molded article | | Good | Good | Good | Poor |
| Flexural strength (kg/cm$^2$) | | 800 | 750 | 700 | 520 |
| Izod impact strength (unnotched) (kg.cm/cm) | | 12 | 10 | 8 | 6 |
| Heat distortion temperature (18.6 kg/cm$^2$) (°C.) | | 173 | 163 | 158 | 147 |

(*): Polymer having units with the molecular structure

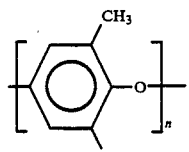

and an inherent viscosity of 0.65.

TABLE 7

| | Ex. 19 | Ex. 20 | Ex. 21 | C Ex. 13 |
|---|---|---|---|---|
| PPS-PPSS copolymer | | | | |
| Type | II | II | II | — |
| Amount (parts by weight) | 80 | 60 | 40 | — |
| PPS (RYTON PR-06) | — | — | — | 60 |
| Polyarylate (U-100, a product of Unitica Ltd.) | 20 | 40 | 60 | 40 |
| Compatibility by the appearance of the molded article | Good | Good | Good | Poor |
| Flexural strength (kg/cm$^2$) | 820 | 750 | 720 | 600 |
| Izod impact strength (unnotched) (kg.cm/cm) | 9 | 6 | 6 | 3 |
| Heat distortion temperature (18.6 kg/cm$^2$) (°C.) | 172 | 164 | 159 | 145 |

TABLE 8

| | Ex. 22 | Ex. 23 | Ex. 24 | C Ex. 14 |
|---|---|---|---|---|
| PPS-PPSS copolymer | | | | |
| Type | II | II | II | — |
| Amount (parts by weight) | 80 | 60 | 40 | — |
| PPS (RYTON PR-06) | — | — | — | 60 |
| Polycarbonate (Novarex 7025, a product of Mitsubishi Chemical Co., Ltd.) | 20 | 40 | 60 | 40 |
| Moldability | Good | Good | Good | Molding impossible |
| Flexural strength (kg/cm$^2$) | 540 | 600 | 620 | |
| Izod impact strength (unnotched) (kg.cm/cm) | 8 | 10 | 13 | |
| Heat distortion temperature (18.6 kg/cm$^2$) (°C.) | 165 | 160 | 155 | |

TABLE 9

| | | Ex. 25 | Ex. 26 | Ex. 27 | CEx. 15 |
|---|---|---|---|---|---|
| PPS-PPSS copolymer | Type | II | II | II | — |
| | Amount (parts by weight) | 80 | 60 | 40 | — |
| PPS (RYTON PR-06) | | — | — | — | 60 |
| Polyetherimide (*) | | 20 | 40 | 60 | 40 |
| Compatibility by the appearance of the molded article | | Good | Good | Good | Poor |
| Flexural strength (kg/cm$^2$) | | 1050 | 1230 | 1350 | 850 |
| Izod impact strength (unnotched) (kg.cm/cm) | | 10 | 18 | 32 | 11 |
| Heat distortion temperature (18.6 kg/cm$^2$) (°C.) | | 158 | 175 | 182 | 162 |

(*): Polymer having the recurring units of the formula

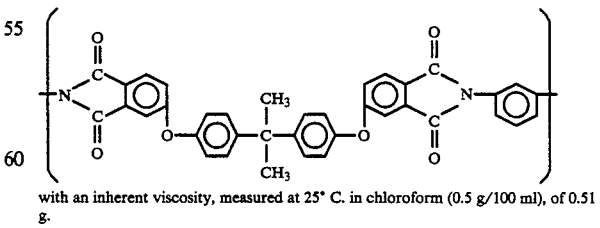

with an inherent viscosity, measured at 25° C. in chloroform (0.5 g/100 ml), of 0.51 g.

EXAMPLES 28-29 AND COMPARATIVE EXAMPLES 16-27

In Example 28, the block copolymer obtained in Example 6 was formed into a film at 310° C. and then quenched in water to obtain a transparent unstretched sheet having a thickness of 420 micrometers. The unstretched sheet was stretched simultaneously in two directions at 130° C. at a stretch ratio of 3.5 times in each direction. The film was heat-set under tension at 230° C. for 2 minutes, and its physical properties were measured.

In Example 29, the block copolymer synthesized in Example 6 and PPS polymer having an [η] of 0.31 were mixed so that the PPSS content became 23% by weight. A film was formed from the mixture in the same way as above, and its physical properties were measured.

In Comparative Example 16, after PPS polymerization reaction, PPS polymer having an [η] of 0.31 and the chlorophenyl-terminated PPSS were mixed so that the mixture had a PPSS content of 23% by weight. A film was prepared from the mixture, and it properties were measured, in the same way as above.

In Comparative Example 17, a film was prepared from the PPS powder alone used in Example 16, and its properties were measured.

The results of measurements are shown in Table 10.

TABLE 10

|  | Example 28 | Example 29 | Comp. Example 16 | Comp. Example 17 |
|---|---|---|---|---|
| Blending (parts by weight) |  |  |  |  |
| Block copolymer | 100 | 50 | 0 | 0 |
| PPS | 0 | 50 | 77 | 100 |
| PPSS | 0 | 0 | 23 | 0 |
| PPSS content (wt. %) | 46 | 23 | 23 | 0 |
| Film properties |  |  |  |  |
| Uniformity | ○ | ○ | X(*) | ○ |
| Density (g/cm³) | 1.42 | 1.39 | 1.38 | 1.36 |
| Tensile strength (kg/mm²) | 12.9 | 12.8 | — | 13.0 |
| Elongation (%) | 100 | 84 | — | 45 |
| Tear strength (g) | 160 | 100 | — | 18 |

(*)A homogenous film could not be formed because of poor compatibility.

In Table 5, the properties were measured by the following methods.

(1) Density
The density was measured by a density gradient tube using an aqueous solution of lithium bromide.

(2) Tensile test

A sample of the film after heat-setting was cut into a piece having a width of 5 mm and a length of 100 to 150 mm, and its break strength (tensile strength) and elongation were measured. In the tensile test, a Tensilon tensile tester was used, and the sample was held by a clip so that the sample length became 50 mm. The sample was stretched at a tensile speed of 200%/min. At this time, the sample was maintained at a temperature of 23° C.

(3) Tear strength
Measured in accordance with the method of JIS P8116-1976.

EXAMPLES 30–35 AND COMPARATIVE EXAMPLES 18–19

PPSS/PPS ($\eta$=0.12) block copolymers ([η]=about 0.12) were prepared by the same synthesizing method as in Example 1 so that the weight proportion of the PPSS segments ($\eta_{inh}$=0.13) was as shown in Table 11.

One hundred parts by weight of each of these block copolymers was mixed with polyphenylene sulfide, an inorganic filler and an additive in the amounts indicated in Table 11. The mixture was melt-kneaded at 320° C. and pelletized in an extruder having a cylinder diameter of 65 mm.

A 16 pin IC lead frame [42 alloy (iron-nickel alloy), 0.25 mm thick) was encapsulated using the resulting pellets. The encapsulated article (6.2 mm × 19.0 mm) was boiled in red ink, and the adhesion of the resin composition to the metal was evaluated on the basis of the degree of penetration of red ink twenty hours later. This evaluation was effected by the following procedure with reference to the accompanying drawing.

As shown in the drawing, the resin composition at the right top portion of the molded article was peeled off, and it was determined which areas ① to ⑦ of the topmost lead were dyed with the red ink. In the drawing, the reference numeral 1 represents the encapsulated lead frame; 2, an island; 3, a molded portion prepared from the resin composition; 4, leads.

The toughness of the pellets was evaluated by measuring the Izod impact strength (unnotched) in accordance with ASTM D256.

The results are summarized in Table 11.

TABLE 11

|  | C Ex. 18 | Ex. 30 | Ex. 31 | Ex. 32 | Ex. 33 | Ex. 34 | Ex. 35 | C Ex. 19 |
|---|---|---|---|---|---|---|---|---|
| PPSS in the copolymer (wt. %) | 0 | 5 | 10 | 20 | 40 | 80 | 80 | 0 |
| PPS |  |  |  |  |  |  |  |  |
| [η] |  |  |  |  | 0.12 | 0.12 | 0.12 | 0.12 |
| Parts by weight | — | — | — | — | 300 | 4900 | 4900 | 5000 |
| Inorganic filler |  |  |  |  |  |  |  |  |
| Type | fused silica (10μ) | fused silica (10μ) | fused silica (10μ) | glass beads | glass fibers (120μ) | glass fibers (150μ) | glass fibers (150μ) | glass fibers (150μ) |
| Amount (parts by weight) | 180 | 180 | 180 | 90 | 320 | 5000 | 5000 | 5000 |
| Type | — | — | — | glass fibers (40μ) | fused silica (30μ) | — | — | — |
| Amount (parts by weight) |  |  |  | 20 | 320 |  |  |  |
| Additive |  |  |  |  |  |  |  |  |
| Type | — | — | — | β-(3,4-epoxy-cyclohexyl)-trimethoxy-silane | — | — | γ-chloro-propyltri-methoxy-silane | γ-chloro-propyltri-methoxy-silane |
| Amount (parts by weight) |  |  |  | 0.2 |  |  | 1 | 1 |
| Melt viscosity at 320° C. (poises) | 400 | 520 | 600 | 620 | 980 | 500 | 470 | 450 |
| Degree of penetration of red ink | ⑦ | ③ | ② | ① | ② | ④ | ④ | ⑦ |
| Izod impact strength | 2 | 4 | 7 | 10 | 9 | 6 | 5 | 3 |

EXAMPLE 36

(A) Synthesis of PPS prepolymer

A 4-liter autoclave was charged with 1280 g of N methylpyrrolidone and 386 g (2.95 moles) of sodium sulfide 2.7-hydrate, and with stirring the temperature was elevated to 200° C. over the course of 2 hours in an atmosphere of nitrogen. Thus, 84 g of water was distilled out. The reaction system was cooled to 150° C., and 425 parts (2.89 moles) of p-dichlorobenzene and 680 g of N-methylpyrrolidone were added. The reaction was carried out at 230° C. for 1.5 hours, and then at 245° C. for 2 hours. At the end of polymerization, the internal pressure was 6.0 kg/cm$^2$. The reactor was cooled, and a small amount of its contents was sampled and filtered. The cake was washed three times with boiling water and then twice with acetone, and dried at 120° C. to obtain a powdery PPS polymer. This polymer had a logarithmic viscosity [$\eta$], as defined hereinabove, of 0.15.

(B) Synthesis of PPS/PPSS block copolymer

The polymerization reaction mixture containing the PPS prepolymer in the reactor was maintained at 100° C., and 157 g (1.20 moles) of sodium sulfide 2.7-hydrate was introduced into the reactor, and in an atmosphere of nitrogen, the mixture was stirred at 100° C. for 1 hours. A mixture of 362 g (1.26 moles) of bis(4-chlorophenyl)sulfone and 400 g of N-methylpyrrolidone was added dropwise over the course of 2 hours. Then, over the course of 1 hour, the temperature was raised to 200° C. The reaction was carried out at this temperature for 2 hours. After the polymerization, the internal pressure was 3.0 kg/cm$^2$. The reactor was cooled, and the contents were filtered. The solid component was washed with N-methylpyrrolidone twice and then with boiling water three times. The resulting cake was dried at 120° C. for 5 hours to give 530 g of a pale brownish powdery polymer (yield 85%). The polymer had an [$\eta$] of 0.20.

When the infrared absorption spectrum of this polymer was measured, peaks other than those assigned to PPS and PPSS were not observed. When PPSS was quantified on the basis of the intensities of characteristic absorption seen at 1320 cm$^{-1}$, 620 cm$^{-1}$ and 480 cm$^{-1}$, it was found that the content of PPSS in the polymer was 50.4% by weight.

The above polymer was dispersed in N-methylpyrrolidone which is a good solvent for PPSS, and an attempt was made to extract the unreacted PPSS at 100° C. No PPSS was dissolved, and the polymer recovered after this extraction test was found to have a PPSS content of 50.4% by weight from its infrared absorption spectrum.

These results led to the determination that the copolymerization reaction product in this example is a block copolymer in which PPS and PPSS were chemically bonded to each other.

EXAMPLES 37-46

Block copolymers were obtained by carrying out the same reaction as in Example 28 except that the polyhalogenated aromatic compounds, dihalodiphenylsulfone, and sulfidization agents and their amounts were changed as indicated in Table 12 and the polymerization aids indicated in Table 12 were added together with the sulfidization agents. The results are shown in Table 12.

TABLE 12

| | Synthesis of PPS Prepolymer | | |
|---|---|---|---|
| Example | Polyhalogenated aromatic compound (moles) | Sulfidization agent (moles) | Polymerization aid (moles) |
| 37 | p-dichlorobenzene (2.89) | sodium sulfide 2.7-hydrate (2.95) | none |
| 38 | p-dichlorobenzene (2.89) | sodium hydrosulfide 1.1-hydrate (3.04) and NaOH (3.04) | none |
| 39 | p-dichlorobenzene (2.89) | sodium hydrosulfide 1.1-hydrate (2.93) and NaOH (2.83) | none |
| 40 | p-dichlorobenzene (2.89) | sodium sulfide 2.7-hydrate (2.95) | lithium acetate (2.95) |
| 41 | p-dichlorobenzene (2.86) and 2,4,6-trichlorobenzene (0.02) | sodium sulfide 2.7-hydrate (2.95) | sodium p-toluene sulfonate (2.95) |
| 42 | p-dichlorobenzene (3.96) | sodium sulfide 2.7-hydrate (4.00) | none |
| 43 | p-dichlorobenzene (3.50) | sodium hydrosulfide 1.1-hydrate (3.64) and NaOH (3.64) | none |
| 44 | p-dichlorobenzene (2.06) | sodium hydrosulfide 1.1-hydrate (2.14) and NaOH (2.14) | none |
| 45 | p-dichlorobenzene (2.75) and m-dichlorobenzene (0.14) | sodium sulfide 2.7-hydrate (2.95) | lithium acetate (2.95) |
| 46 | p-dichlorobenzene (2.75) and 4,4-dichlorobenzo- | sodium sulfide 2.7-hyrate (2.95) | lithium acetate (2.95) |

TABLE 12-continued phenone (0.14)

| | | Synthesis of a copolymer | | | |
|---|---|---|---|---|---|
| | bis-(4-Chloro-phenyl- | | Polymeri-zation | Copolymer produced | |
| Example | sulfone (moles) | Sulfidization agent (moles) | aid (moles) | Yield (%) | [η] |
| 37 | 1.26 | sodium sulfide 2.7-hydrate (1.00) | none | 87 | 0.18 |
| 38 | 1.26 | sodium hydrosulfide 1.1-hydrate (1.10) and NaOH (1.10) | lithium acetate (1.10) | 85 | 0.16 |
| 39 | 1.26 | sodium sulfide 2.7-hydrate (1.23) | lithium acetate (0.62) | 81 | 0.21 |
| 40 | 1.26 | sodium sulfide 2.7-hydrate (1.20) | none | 88 | 0.30 |
| 41 | 1.26 | sodium hydrosulfide 1.1-hydrate (1.20) and NaOH (1.20) | none | 84 | 0.28 |
| 42 | 0.19 | sodium sulfide 2.7-hydrate (0.15) | sodium acetate (2.06) | 90 | 0.17 |
| 43 | 0.65 | sodium sulfide 2.7-hydrate (0.51) | none | 85 | 0.17 |
| 44 | 2.09 | sodium hydrosulfide 1.1-hydrate (2.00) and NaOH (2.00) | sodium benzoate (2.00) | 80 | 0.23 |
| 45 | 1.26 | sodium sulfide 2.7-hydrate (1.20) | none | 86 | 0.25 |
| 46 | 1.25 | sodium sulfide 2.7-hydrate (1.20) | none | 82 | 0.21 |

EXAMPLE 47

4500 Parts by weight of PPS ([η]=0.12), 500 parts by weight of polysulfone (P-1700 produced by Union Carbide Corporation; $\eta_{inh}$=0.28), 100 parts by weight of the block copolymer ([η]=0.14)) containing 50.4% by weight of PPSS segments synthesized in Example 36, and 6000 parts by weight of fused silica beads were melt-kneaded at 360° C. in a 65 mm extruder and pelletized. The properties were evaluated as in Examples 30 to 35. The copolymer had a degree of red ink penetration of ①, and an Izod impact strength (unnotched) of 8 kg-cm/cm.

COMPARATIVE EXAMPLE 20

Example 47 was repeated except that the block copolymer was not used. The degree of red ink penetration was ③, but the Izod impact strength (unnotched) was as low as 3 kg-cm/cm.

EXAMPLE 48

When a 9 pin resistor was encapsulated with the resin composition obtained in Example 31, higher reliability was obtained than in the case of using a conventional epoxy encapsulating composition.

What is claimed is:

1. A process for producing a block copolymer composed of polyphenylene sulfide segments and polyphenylene sulfide sulfone segments and having a logarithmic viscosity (η) of 0.03 to 1.0, said logarithmic viscosity (η) being determined at 206° C. for its solution in alpha-chloronaphthalene in a polymer concentration wherein said polyphenylene sulfide segments consist of at least 70 mole % of p-phenylene sulfide units and said polyphenylene sulfide sulfone segments consist of at least 90 mole % of phenylene sulfide sulfone segments, of 0.4 g/100 ml of solution and calculated in accordance with the equation (η)=ln (relative viscosity)/polymer concentration, which comprises reacting a polyphenylene sulfide prepolymer with a mixture of a dihalodiphenylsulfone and a sulfidization agent, or a polyphenylene sulfide sulfone prepolymer with a mixture of a polyhalogenated aromatic compound and a sulfidization agent, in a polar solvent select from the group consisting of N,N-dimethylformamide, N,N-dimethylacetamide, N-methyl-2-pyrrolidone, N-ethyl-2-pyrrolidone, N-methyl-epsilon-caprolactam, hexamethylphosphoramide and mixtures thereof wherein said polyphenylene sulfide prepolymer consists essentially of at least 70 mole % of structural units represented by the formula

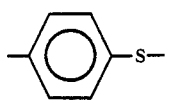

and not more than 30 mole % of structural units selected from the group consisting of

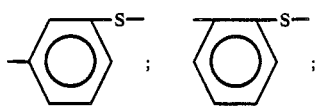

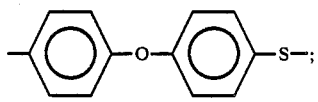

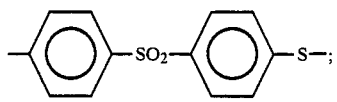

-continued

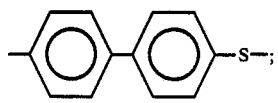

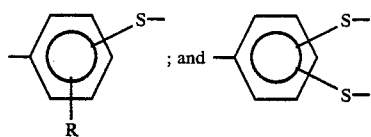

wherein R represents an alkyl group, a nitro group, a phenyl group, an alkoxy group, a carboxylic acid group or a metal carboxylate group, and wherein said polyphenylene sulfide sulfone prepolymer consists essentially of at least 90 mole % of structural units represented by the formula

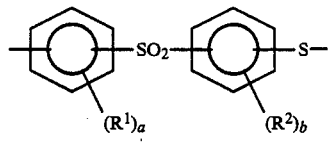

wherein groups bonded to both terminals of the polymer are ortho- or para- to the sulfone group, $R^1$ and $R^2$ represent hydrogen or a $C_1$–$C_8$ alkyl group /or an aryl group, and a and b are integers of 0 to 4, and not more than 10 mole % of structural units selected from the group consisting of

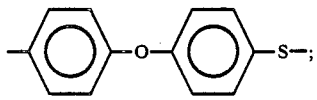

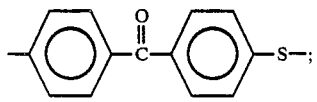

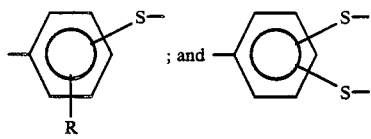

wherein R represents an alkyl group, a nitro group, a phenyl group, a carboxylic acid group or a metal carboxylate group.

2. The process of claim 1 wherein the polyphenylene sulfide prepolymer has a sodium sulfide group or a chlorophenyl group at a molecular terminal thereof.

3. The process of claim 1 wherein the polyphenylene sulfide prepolymer had a logarithmic viscosity [$\eta$], as defined, of 0.03 to 0.80.

4. The process of claim 1 wherein the polyphenylene sulfide sulfone prepolymer has a logarithmic viscosity $\eta_{inh}$ of 0.05 to 1.0, said logarithmic viscosity $\theta_{inh}$ being determined at 30° C. for its solution in a phenyl/1,1,2,2-tetrachloroethane (3:2 by weight) mixed solvent in a polymer concentration of 0.5 g/100 ml of solution and calculated in accordance with the equation $\eta_{inh}=\ln$ (relative viscosity)/polymer concentration.

5. The process of claim 1 wherein the sulfidization agent is an alkali metal sulfide compound alone or a mixture of a sulfur source and an alkali metal hydroxide compound.

6. The process of claim 1 wherein the polyhalogenated aromatic compound is a halogenated aromatic compound having at least two halogen atoms directly bonded to the aromatic ring.

* * * * *

UNITED STATES PATENT AND TRADEMARK OFFICE
CERTIFICATE OF CORRECTION

PATENT NO. : 4,960,841
DATED : October 2, 1990
INVENTOR(S) : KAWABATA, ET AL.

It is certified that error appears in the above-identified patent and that said Letters Patent is hereby corrected as shown below:

Column 35-38:

Claim 1 should be rewritten as follows:

1. A process for producing a block copolymer composed of polyphenylene sulfide segments and polyphenylene sulfide sulfone segments and having a logarithmic viscosity (η) of 0.03 to 1.0, said logarithmic viscosity (η) being determined at 206°C for its solution in alpha-chloronaphthalene in a polymer concentration [wherein said polyphenylene sulfide segments consist of at least 70 mole % of p-phenylene sulfide units and said polyphenylene sulfide sulfone segments consist of at least 90 mole % of phenylene sulfide sulfone segments,] of 0.4 g/100 ml of solution and calculated in accordance with the equation (η)=ln (relative viscosity)/polymer concentration, <u>wherein said polyphenylene sulfide segments consist of at least 70 mole % of p-phenylene</u>

UNITED STATES PATENT AND TRADEMARK OFFICE
CERTIFICATE OF CORRECTION

PATENT NO. : 4,960,841
DATED : October 2, 1990
INVENTOR(S) : KAWABATA, ET AL.

It is certified that error appears in the above-identified patent and that said Letters Patent is hereby corrected as shown below:

<u>sulfide units and said polyphenylene sulfide sulfone segments consist of at least 90 mole % of phenylene sulfide sulfone segments,</u> which comprises reacting a polyphenylene sulfide prepolymer with a mixture of a dihalodiphenyl-sulfone and a sulfidization agent, or a polyphenylene sulfide sulfone prepolymer with a mixture of a polyhalogenated aromatic compound and a sulfidization agent, in a polar solvent selected from the group consisting of N,N-dimethylformamide, N,N-dimethylacetamide, N-methyl-2-pyrrolidone, N-ethyl-2-pyrrolidone, N-methyl-epsilon-caprolactam, hexamethylphosphoramide and mixtures thereof wherein said polyphenylene sulfide prepolymer consists essentially of at least 70 mole % of structural units represented

UNITED STATES PATENT AND TRADEMARK OFFICE
CERTIFICATE OF CORRECTION

PATENT NO. : 4,960,841
DATED : October 2, 1990
INVENTOR(S) : KAWABATA, ET AL.

Page 3 of 7

It is certified that error appears in the above-identified patent and that said Letters Patent is hereby corrected as shown below:

by the formula

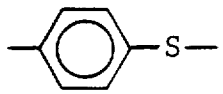

and not more than 30 mole % of structural units selected from the group consisting of

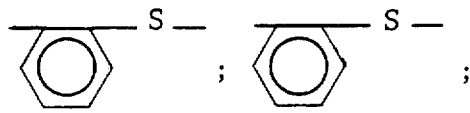

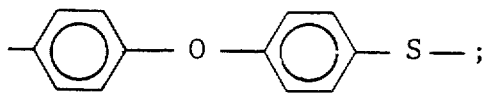

UNITED STATES PATENT AND TRADEMARK OFFICE
CERTIFICATE OF CORRECTION

PATENT NO. : 4,960,841
DATED : October 2, 1990
INVENTOR(S) : KAWABATA, ET AL.

It is certified that error appears in the above-identified patent and that said Letters Patent is hereby corrected as shown below:

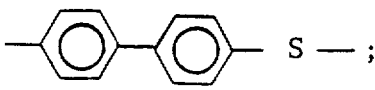

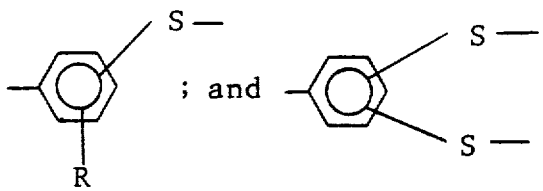

wherein R represents an alkyl group, a nitro group, a phenyl group, an alkoxy group, a carboxylic acid group or a metal carboxylate group, and

UNITED STATES PATENT AND TRADEMARK OFFICE
CERTIFICATE OF CORRECTION

PATENT NO. : 4,960,841
DATED : October 2, 1990
INVENTOR(S) : KAWABATA, ET AL.

It is certified that error appears in the above-identified patent and that said Letters Patent is hereby corrected as shown below:

wherein said polyphenylene sulfide sulfone prepolymer consists essentially of at least 90 mole % of structural units represented by the formula

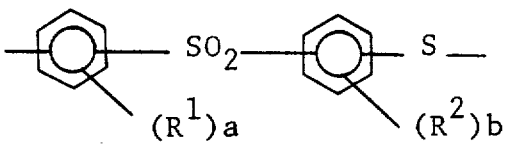

wherein groups bonded to both terminals of the polymer are ortho- or para- to the sulfone group, $R^1$ and $R^2$ represent hydrogen or a $C_1$-$C_8$ alkyl group/or an aryl group, and a and b are integers of 0 to 4, and not more than 10 mole % of structural units selected from the group consisting of

UNITED STATES PATENT AND TRADEMARK OFFICE
CERTIFICATE OF CORRECTION

PATENT NO. : 4,960,841
DATED : October 2, 1990
INVENTOR(S) : KAWABATA, ET AL.

It is certified that error appears in the above-identified patent and that said Letters Patent is hereby corrected as shown below:

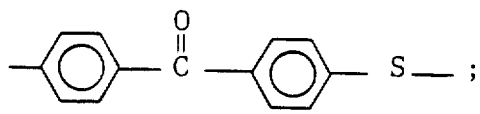

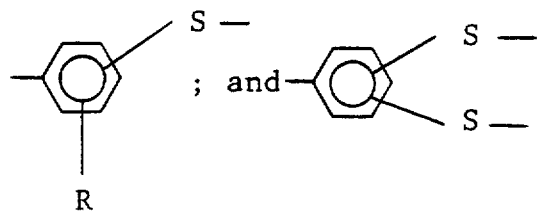

wherein R represents an alkyl group, a nitro group, a phenyl group, a carboxylic acid group or a metal carboxylate group.

Claim 4, line 3, delete "θ", insert --η--.

UNITED STATES PATENT AND TRADEMARK OFFICE
CERTIFICATE OF CORRECTION

PATENT NO. : 4,960,841
DATED : October 2, 1990
INVENTOR(S) : KAWABATA, ET AL.

It is certified that error appears in the above-identified patent and that said Letters Patent is hereby corrected as shown below:

Column 38, claim 4, line 29, delete "$\theta$", insert --$\eta$--.

Signed and Sealed this

Twenty-first Day of July, 1992

Attest:

DOUGLAS B. COMER

*Attesting Officer*    Acting Commissioner of Patents and Trademarks